United States Patent
Motonishi

(10) Patent No.: US 7,573,678 B2
(45) Date of Patent: Aug. 11, 2009

(54) MAGNETIC HEAD SLIDER WITH SHOCK ABSORPTION LAYER AND MANUFACTURING THE SAME

(75) Inventor: Michiharu Motonishi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 502 days.

(21) Appl. No.: 11/362,120

(22) Filed: Feb. 23, 2006

(65) Prior Publication Data

US 2006/0256476 A1  Nov. 16, 2006

(30) Foreign Application Priority Data

Mar. 2, 2005  (JP)  ............... 2005-057606

(51) Int. Cl.
*G11B 5/60* (2006.01)
(52) U.S. Cl. .................................. 360/235.4
(58) Field of Classification Search .......... 360/235.6, 360/234.5, 235.3, 236.3, 237
See application file for complete search history.

(56) References Cited

U.S. PATENT DOCUMENTS

| | | | | |
|---|---|---|---|---|
| 6,466,410 B2 * | 10/2002 | Polycarpou et al. | ...... | 360/236.6 |
| 6,490,134 B2 * | 12/2002 | Boutaghou | ............... | 360/235.7 |
| 6,995,952 B2 * | 2/2006 | Feliss et al. | .............. | 360/235.3 |
| 7,167,343 B2 * | 1/2007 | Feliss et al. | .............. | 360/236.3 |
| 2002/0030936 A1 * | 3/2002 | Iwasaki | ............... | 360/235.6 |
| 2003/0123190 A1 | 7/2003 | Sato et al. | | |
| 2007/0019327 A1 * | 1/2007 | Maruyama et al. | ......... | 360/126 |
| 2007/0279804 A1 * | 12/2007 | White | ............... | 360/234.3 |

FOREIGN PATENT DOCUMENTS

| | | |
|---|---|---|
| JP | 06-275037 | 9/1994 |
| JP | 08-147918 | 6/1996 |
| JP | 11-339416 | 12/1999 |
| JP | 2000-207860 | 7/2000 |
| JP | 2001-014823 | 1/2001 |
| JP | 2001-84543 | 3/2001 |

OTHER PUBLICATIONS

Notice of Preliminary Rejection for corresponding Japanese Patent Application Serial No. 2005-057606, dated Aug. 14, 2007.

* cited by examiner

*Primary Examiner*—Allen T Cao
(74) *Attorney, Agent, or Firm*—Brinks Hofer Gilson & Lione

(57) ABSTRACT

A magnetic head slider and a method of manufacturing the same. At a leading side of a slider substrate, a shock absorbing layer is provided which has a hardness lower than a hardness of the slider substrate, and a projecting portion is provided on a surface of the shock absorbing layer. If an external force is applied to the slider substrate and the leading side of the slider substrate becomes closer to a magnetic disk, only the projecting portions contact with the magnetic disk. A height of a convex portion and a depth of a concave portion, which are generated on the surface of the magnetic disk, can be decreased, so that it is possible to prevent the magnetic disk from being damaged.

25 Claims, 26 Drawing Sheets

MAGNETIC HEAD SLIDER WITH SHOCK ABSORPTION LAYER AND MANUFACTURING THE SAME

BACKGROUND OF THE INVENTION

1. Field of the Invention

The present invention relates to a magnetic head slider in which recording and/or reproducing magnetic elements are mounted so as to perform a recording and/or reproducing operation on a recording medium, such as a magnetic disk or the like, and a method of manufacturing the same. More particularly, the present invention relates to a magnetic head slider capable of, when an external force is applied to the magnetic head slider and the magnetic head slider comes in contacts with a recording medium, preventing the recording medium from being damaged, and a method of manufacturing the same.

2. Description of the Related Art

In JP-A-2001-84543 (Pub. No.: US 2003/0123190 A1), a conventional magnetic head slider is disclosed.

FIG. 26 is an enlarged perspective view illustrating a main portion of the conventional magnetic head. FIG. 26 uses the same diagram as FIG. 2 of JP-A-2001-84543.

As shown in FIG. 26, a slider 200 includes a head element 202 that is provided on one end face 201a of a slider substrate 201, four bumps 203 (including two recording bumps and two reproducing bumps) each of which is electrically connected to the head element 202 and made of a superior conductive material, such as Ni or the like, and a protective film 204 that covers the head element 202 and is made of an insulating material, such as alumina or the like. An exposed portion 203a of each of the bumps 203, which are exposed to the protective film 204, is flush with or exposed to the surface of the protective film 204. An insulating film 205 is formed on an entire surface of the other end face 201b which is opposite to one end face 201a of the slider substrate 201. The insulating film 205 is composed of a film, such as an alumina film, a $SiO_2$ film, or the like, and has a thickness of 0.3 to 1 µm.

In JP-A-11-339416, a conventional magnetic head slider is disclosed.

A tapered portion and a convex portion are formed at the air inflow side of the magnetic head slider, and the surface of the convex portion is on the same plane as the surface of the tapered portion.

In the magnetic head slider disclosed in JP-A-2001-84543, if external force is applied to the slider 200, the slider 200 moves forward and backward by about 10° from a floating posture.

In this case, the slider substrate 201 is formed of a ceramic material, such as $Al_2O_3$—TiC, and the insulating film 205 is formed of a material, such as alumina or $SiO_2$, which has hardness lower than that of the ceramic material. For this reason, although not shown in FIG. 26, a surface of the insulating film 205 at the magnetic disk side (Z1 side in the drawing) is located closer to a side (Z2 side in the drawing) opposite to the magnetic disk side than a magnetic disk facing surface 201c of the slider substrate 201 by means of an etching process for forming an ABS surface of the slider 200. That is, a so-called recess is generated between the insulating film 205 and the slider substrate 201. In addition, the insulating film 205 has a thickness of 0.3 to 1 µm. For this reason, when the external force is applied to the slider 200 and the slider 200 moves from the floating posture, a portion of the slider 200 where a recess is formed, that is, an edge portion 201d of the slider substrate 201 at the X1 side in the drawing may contact with the magnetic disk, thereby severely damaging the magnetic disk. Specifically, in the magnetic head slider disclosed in JP-A-2001-84543, when the slider 200 contacts with the magnetic disk, it is not possible to prevent the magnetic disk from being damaged by using the insulating film 205.

In the magnetic head slider disclosed in JP-A-11-339416, the surface of the tapered portion is on the same plane as the tapered portion. In addition, the tapered portion is formed of a hard material, similar to the magnetic head slider substrate. For this reason, when the external force is applied to the magnetic head slider and the magnetic head slider moves, not only the convex portion but also the taper portion may contact with the magnetic disk, thereby severely damaging the magnetic disk.

SUMMARY OF THE INVENTION

The present invention has been finalized in view of the drawbacks inherent in the conventional antenna, and it is an object of the invention to provide a magnetic head slider which is capable of reducing damage to a recording medium when an external force is applied to the magnetic head slider and the magnetic head slider comes in contact with the recording medium, and a method of manufacturing the same.

A magnetic head slider according to a first aspect of the invention includes a slider substrate that has a recording medium facing surface on which ABS surface protruding toward a recording medium is provided; and recording and/or reproducing magnetic elements that are provided at a trailing side of the slider substrate. In addition, a shock absorbing layer that has hardness lower than hardness of the slider substrate is provided at a leading side of the slider substrate opposite to the trailing side with a thickness of 20 to 40 µm.

According to this aspect, since the shock absorbing layer is provided at the leading side of the slider substrate, if the leading side of the slider substrate becomes closer to the recording medium, the leading side of the slider substrate does not contact with the recording medium, and only the shock absorbing layer contacts with the recording medium. In addition, the shock absorbing layer is formed of a material having hardness lower than the hardness of the slider substrate, and the thickness of the shock absorbing layer is within a range of 20 to 40 µm. For this reason, the height of the convex portion and the depth of the concave portion formed on the surface of the recording medium become lower, as compared with a conventional case in which the leading side of the slider substrate contacts with the recording medium. That is, it is possible to prevent the recording medium from being damaged.

Preferably, the shock absorbing layer is formed of a material of $Al_2O_3$ or $SiO_2$.

A magnetic head slider according to a second aspect of the invention includes: a slider substrate that has a recording medium facing surface on which ABS surface protruding toward a recording medium is provided; and recording and/or reproducing magnetic elements that are provided at a trailing side of the slider substrate. Further, a shock absorbing layer that has hardness lower than hardness of the slider substrate is provided at a leading side of the slider substrate opposite to the trailing side; and projecting portions protruding toward the recording medium are provided on a surface of the shock absorbing layer.

Preferably, the shock absorbing layer is formed of a material of $Al_2O_3$ or $SiO_2$.

Preferably, each of the projecting portions is formed of a material that has the hardness lower than the hardness of the slider substrate.

According to this aspect, since the projecting portions protrude toward the recording medium, if the leading side of the slider substrate becomes closer to the recording medium, the leading side of the slider substrate does not contact with the recording medium, and only the projecting portion contacts with the recording medium. In addition, the projecting portion is formed of a material that has hardness lower than the hardness of the slider substrate. For this reason, the height of the convex portion and the depth of the concave portion formed on the surface of the recording medium become smaller than those of the case where the shock absorbing layer contacts with the recording medium, in the magnetic head slider in which only the shock absorbing layer is provided at the leading side of the slider substrate. That is, it is possible to further prevent the recording medium from being damaged.

Preferably, each of the projecting portions is formed of a material of $Al_2O_3$ or $SiO_2$.

Preferably, the shock absorbing layer and the projecting portions are formed of the same material.

By using this configuration, the projecting portions can be easily formed in a method of manufacturing a magnetic head slider, which will be described in detail below.

Preferably, each of the projecting portions and the shock absorbing layer is formed as a separate body. Alternatively, the projecting portions and the shock absorbing layer are integrally formed.

Preferably, each of the projecting portions protrudes toward the recording medium side rather than a position of a leading-side end portion of the slider substrate.

Preferably, a circumference of the ABS surface is cut so as to form step surface located closer to a supporting surface side of the magnetic head slider than the ABS surface.

If the step surfaces are formed, it is possible to easily guide the airflow between the magnetic head slider and the recording medium at the time of driving the recording medium.

Preferably, leading-side peripheral portion of the ABS surface or the step surface is located closer to the slider substrate side than a bonding surface between the slider substrate and the shock absorbing layer. Alternatively, leading-side peripheral portion of the ABS surface or the step surface is located closer to the shock absorbing layer side than a bonding surface between the slider substrate and the shock absorbing layer.

Preferably, protruding portions protruding toward the recording medium are provided on a surface of a protective layer of each of the magnetic elements that are provided at the trailing side of the slider substrate.

If the projecting portion is formed, an external force is applied to the slide substrate due to the shock or the like, and the trailing side of the slider substrate moves downward to become closer to the recording medium. In this case, the trailing side of the slider substrate does not contact with the recording medium, and only the projecting portions contact with the recording medium. For this reason, it is possible to prevent the recording medium from being damaged, as a conventional case in which the trailing side of the slider substrate contacts with the recording medium.

A method of manufacturing a magnetic head slider according to a third aspect of the invention includes steps of: (a) forming recording and/or reproducing magnetic elements on a slider substrate, and forming a shock absorbing layer having a hardness lower than hardness of the slider substrate with a thickness of 20 to 40 μm on a leading-side end face of the slider substrate opposite to a trailing-side end face in which the magnetic elements are formed; (b) covering a recording medium-side ABS surface of the slider substrate with a mask layer, the shock absorbing layer being provided at slider substrate; and (c) forming an ABS surface by cutting a recording medium-side region of the slider substrate which is not covered with the mask layer.

A method of manufacturing a magnetic head slider according to a fourth aspect of the invention includes steps of: (d) forming recording and/or reproducing magnetic elements on a slider substrate, and forming a shock absorbing layer having a hardness lower than hardness of the slider substrate on a leading-side end face of the slider substrate opposite to a trailing-side end face in which the magnetic elements are formed; (e) forming projecting portions protruding toward a recording medium on a recording medium facing surface of the shock absorbing layer; (f) covering a recording medium-side ABS surface of the slider substrate with a mask layer, the shock absorbing layer being provided at the slider substrate; and (g) forming an ABS surface by cutting a recording medium-side region of the slider substrate which is not covered with the mask layer.

Preferably, during in the step (e), each of the projecting portions is formed of material that has hardness lower than hardness of the slider substrate.

Preferably, in the step (e), each of the projecting portions is formed of a material of $Al_2O_3$ or $SiO_2$.

Preferably, in the step (e), the shock absorbing layer and the projecting portions are formed of the same material.

By using this configuration, the projecting portion can be easily formed.

Preferably, in the step (e), the projecting portions and the shock absorbing layer are formed as a separate body.

Preferably, in the step (e), the projecting portions and the shock absorbing layer are integrally formed.

When the projecting portions and the shock absorbing layer are integrally formed, the projecting portion can be formed by using only the etching process. Therefore, it is possible to easily form the projecting portions and the magnetic head slider having the projecting portions.

Preferably, in the steps (f) and (g) instead of the step (e), the projecting portions are formed at the same time when forming the ABS surface.

By using this configuration, the projecting portions, and the magnetic head slider having the projecting portions can be easily manufactured in a short time.

Preferably, each of the projecting portions protrudes toward the recording medium side rather than a position of a leading-side end portion of the slider substrate.

Preferably, in the step (b), a leading-side peripheral portion of the mask layer is located closer to the slider substrate side than a bonding surface between the slider substrate and the shock absorbing layer. Alternatively, in the step (b), a leading-side peripheral portion of the mask layer is located closer to the shock absorbing layer side than a bonding surface between the slider substrate and the shock absorbing layer.

Preferably, the method of manufacturing a magnetic head slider may further include a step of forming step surfaces by cutting circumferences of the ABS surfaces after the step (c).

Preferably, in the step (a), the shock absorbing layer is formed of a material of $Al_2O_3$ or $SiO_2$.

Preferably, a protective layer for covering the magnetic elements is provided at a trailing side of the slider substrate, and protruding portions protruding toward the recording medium are formed on a surface of the protective layer.

In the magnetic head slider according to the aspects of the invention, when the external force is applied to the slide substrate and the slide substrate contacts with the recording medium, it is possible to prevent the recording medium from being damaged. In the method of a magnetic head slider according to the aspects of the invention, the magnetic head slider can be manufactured.

DESCRIPTION OF THE PREFERRED EMBODIMENTS

Figure 1:
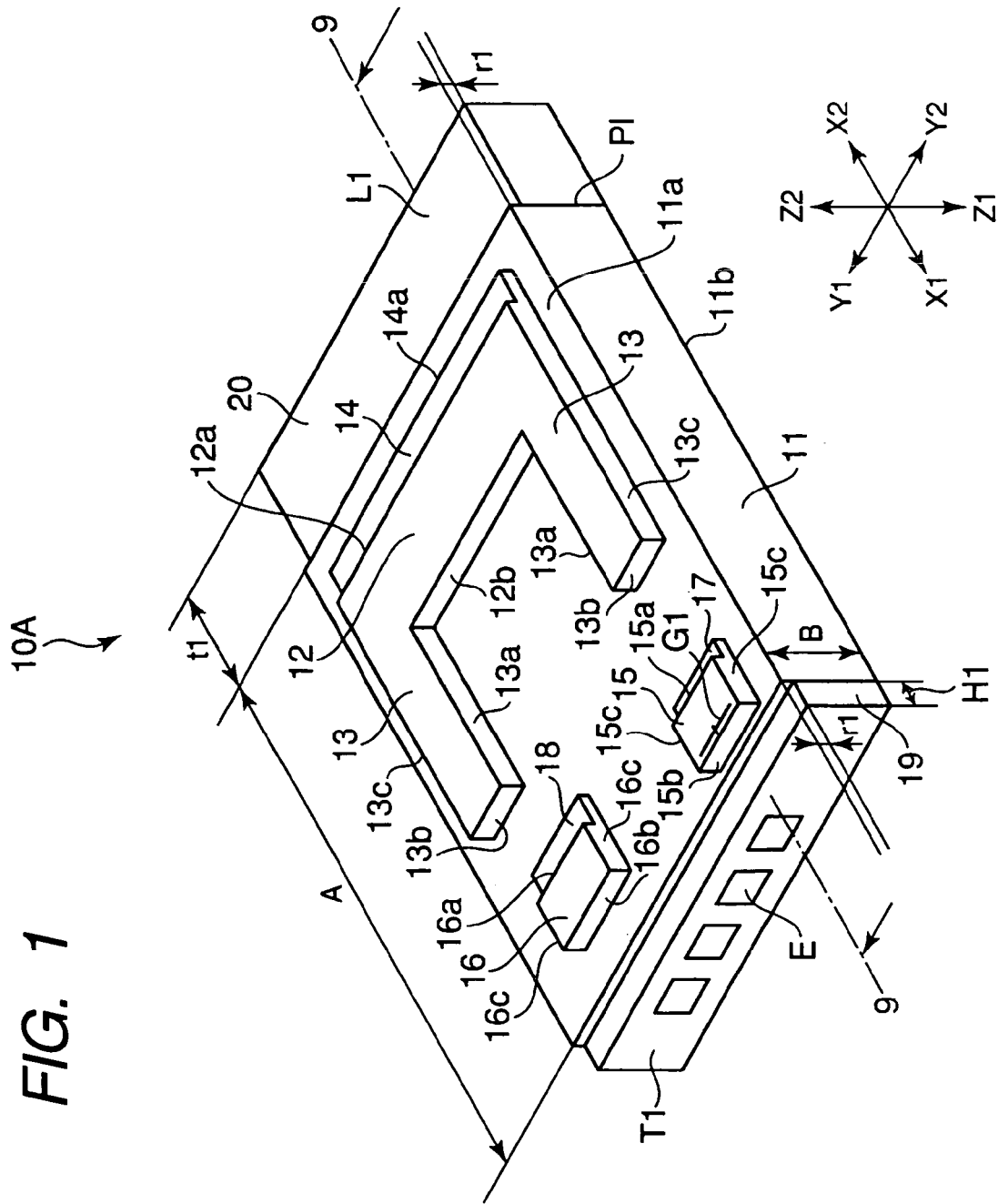
FIG. 1 is a perspective view illustrating a magnetic head slider according to a first embodiment of the invention in a state in which a surface of the magnetic head slider opposite to a magnetic disk is faced up.
Figure 2:
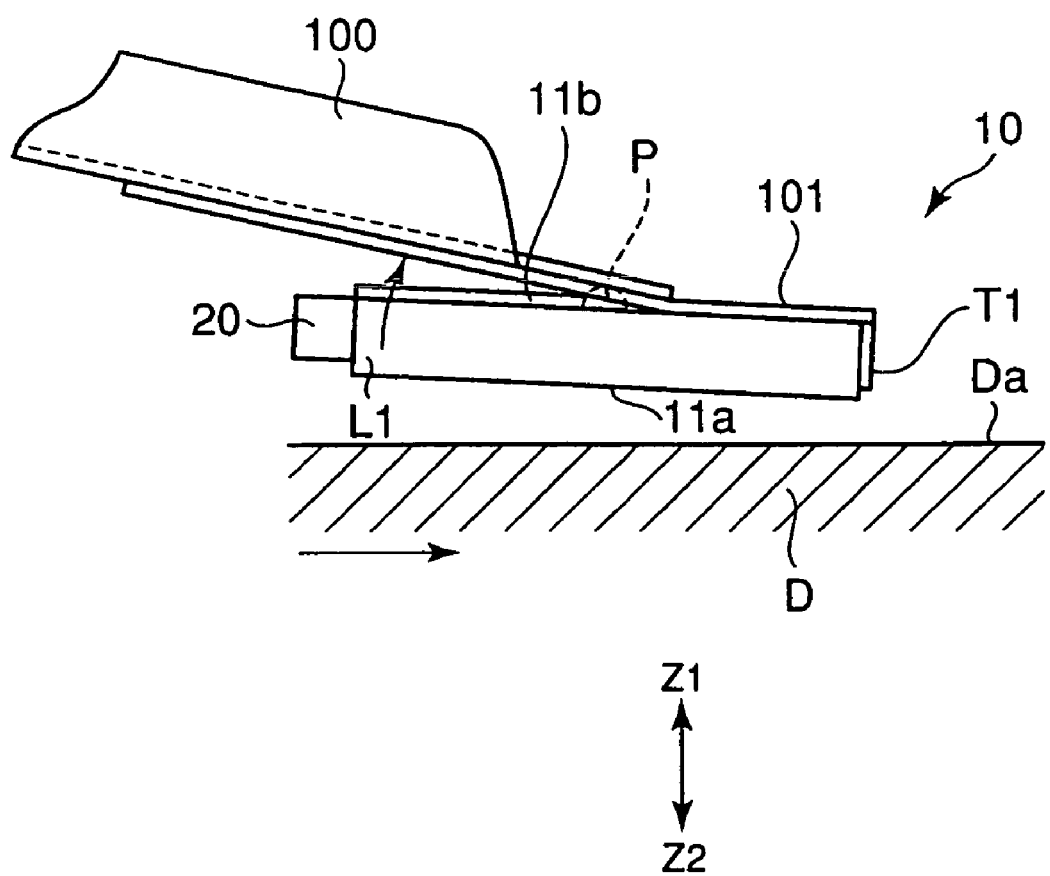
FIG. 2 is a partial side view illustrating a state in which the magnetic head slider according to the first embodiment of the invention floats on the magnetic disk.
Figure 3:
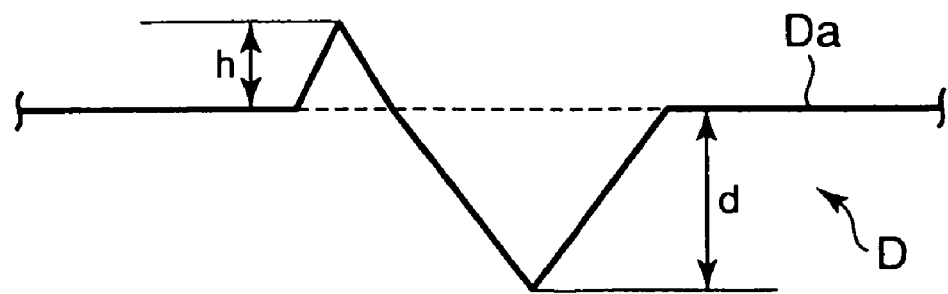
FIG. 3 is a diagram schematically illustrating a surface state of the magnetic disk when the magnetic head slider contacts with the magnetic disk.

FIG. 1 is a perspective view illustrating a magnetic head slider according to a first embodiment of the invention in a state in which a surface of the magnetic head slider opposite to a magnetic disk is faced up. FIG. 2 is a partial side view illustrating a state in which the magnetic head slider according to the first embodiment of the invention floats on the magnetic disk. FIG. 3 is a diagram schematically illustrating a surface state of the magnetic disk when the magnetic head slider contacts with the magnetic disk.

A magnetic head slider 10 according to the embodiment of the invention forms a portion of a magnetic head device (not shown). As shown in FIG. 2, for example, a supporting member is mounted on a supporting surface 11*b* opposite to a magnetic disk facing surface 11*a* (recording medium facing surface) which is a facing surface of a magnetic disk D (recording medium), and the magnetic head slider 10 is elastically supported by means of the supporting member. The supporting member has, for example, a plate spring load beam 100 and a thin plate spring flexure 101 (elastic supporting member).

If the magnetic disk D starts to rotate in a direction shown by an arrow, air flows from a leading-side end portion L1 to a trailing-side end portion T1 below the magnetic disk facing surface 11*a* of the magnetic head slider 10 (Z2 side in the drawing). In this case, an air inflow side of the magnetic head slider 10 is referred to as a 'leading side' and an air outflow side of the magnetic head slider 10 is referred to as a 'trailing side'.

If the air flows from the leading-side end portion L1 to the trailing-side end portion T1, the leading-side end portion L1 is lifted above the magnetic disk D (Z1 side in the drawing) on the basis of a pivot P, and the magnetic head slider 10 floats on the magnetic disk D. In this state, the magnetic head slider 10 records a magnetic signal on the magnetic disk D or reproduces the magnetic signal recorded on the magnetic disk D.

The magnetic head slider 10A according to the first embodiment has a slider substrate 11, and the slider substrate 11 is formed of a material, such as, for example, alumina titanium carbide, or the like. A length A of the slider substrate 11 in a direction of X1-X2 in the drawing is within a range of 500 to 2000 μm, and a height B thereof (a length of the slider substrate 11 in a direction of Z1-Z2 in the drawing) is within a range of 100 to 500 μm.

At the trailing-side end portion T1 of the slider substrate 11, a magnetic element (only a gap portion G1 is shown and the other portion is not shown) and electrodes E are provided. In this case, the magnetic element has a thin-film reproducing element that serves as a reproducing magnetic function portion and uses a magnetoresistance effect, and an inductive thin-film recording element that serves as a recording magnetic function portion. Further, a protective layer 19 is provided to protect the magnetic element. The protective layer 19 is made of a material, such as $Al_2O_3$ or the like, with a thickness H1 of 30 to 50 μm. In this case, since the hardness of the protective layer 19 is lower than that of the slider substrate 11, an amount of cut protective layer 19 is larger than an amount of cut slider substrate 11 in an etching process, which will be described in detail below. For this reason, at the interface between the slider substrate 11 and the protective layer 19, a step caused by a hardness difference between the materials, that is, a so-called recess r1 is formed, as shown in FIG. 1. This recess r1 has a width of 0 to 3 μm.

At the leading-side end portion L1 of the slider substrate 11, a shock absorbing layer 20 is provided. This shock absorbing layer 20 is formed of a material, such as $Al_2O_3$, $SiO_2$, or the like, which has hardness lower than that of the slider substrate 11, and has a thickness t1 of 20 to 40 μm. Further, similar to the interface between the slider substrate 11 and the protective layer 19, a recess r1 is formed at the interface between the slider substrate 11 and the shock absorbing layer 20.

Further, on the magnetic disk facing surface 11*a* of the slider substrate 11, a leading-side ABS surface 12 and rail surfaces 13 and 13 having steps are formed. In this case, the leading-side ABS surface 12 protrudes toward the magnetic disk D, and the rail surfaces 13 and 13 extend from both sides of the leading-side ABS surface 12 in a widthwise direction (Y1-Y2 direction in the drawing) to the trailing side (a direction toward a trailing-side end portion T1, and an X1 direction in the drawing).

Between a leading-side peripheral portion 12*a* of the leading-side ABS surface 12 and the magnetic disk facing surface 11*a*, a step surface 14, which is lower than the leading-side ABS surface 12 by one step, that is, located closer to the supporting surface 11*b* side (Z1 side in the drawing) than the leading-side ABS surface 12, protrudes from the magnetic disk facing surface 11*a*. In addition, the step surface 14 is formed such that the airflow can be easily guided between the magnetic head slider 10A and the magnetic disk D at the time of driving the magnetic disk D. Each of the trailing-side ABS surfaces 15 and 16 has an effect that easily performs a positive pressure adjustment for floating the magnetic head slider 10A and an effect that decreases a grounding area when the magnetic head slider 10A is landed on the magnetic disk D and reduces torque that is necessary for driving the magnetic disk D again. Further, the gap portion G1 of the magnetic element appears on one trailing-side ABS surface 15.

Further, between the leading-side peripheral portions 15*a* and 16*a* of the trailing-side ABS surfaces 15 and 16 and the magnetic disk facing surface 11*a*, step surfaces 17 and 18, which are lower than the trailing-side ABS surfaces 15 and 16 by one step, respectively, protrude from the magnetic disk facing surface 11*a*.

Next, the characteristics according to the present embodiment will be described.

If the external force is applied to a load beam 100 of the magnetic head device due to a shock or the like, the magnetic head slider 10A moves upward and downward from a floating posture on the basis of the pivot P. At this time, the leading-side end portion L1 of the slider substrate 11 also moves upward and downward. If the leading-side end portion L1 moves downward, it becomes closer to the magnetic disk D.

According to the present embodiment, since the shock absorbing layer 20 is provided at the leading-side end portion L1 of the slider substrate 11, if the leading-side end portion L1 becomes closer to the magnetic disk D, the leading-side end portion L1 does not contact with the magnetic disk D, and only the shock absorbing layer 20 contacts with the magnetic disk D. Further, the shock absorbing layer 20 is formed of a material which has hardness lower than that of the slider substrate 11, and the thickness thereof is within a range of 20 to 40 μm. For this reason, the height h of the convex portion and the depth d of the concave portion, which are formed on the surface Da of the magnetic disk D, can be decreased, as compared with a conventional case in which the leading-side end portion L1 contacts with the magnetic disk D. That is, it is possible to prevent the convex portion and the concave portion from being formed on the magnetic disk D (hereinafter, this will be referred to as that 'the magnetic disk D is damaged').

Figure 4:
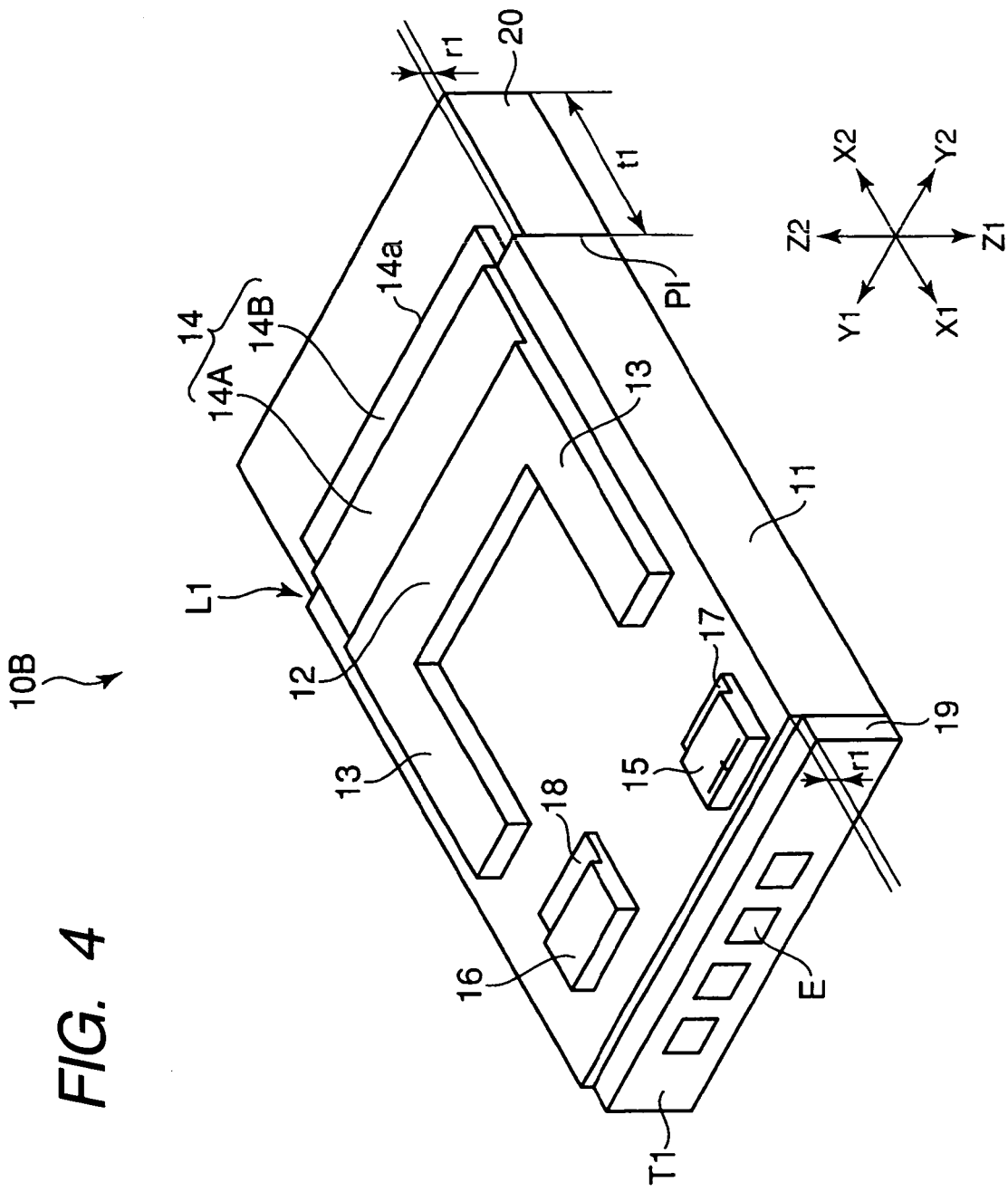
FIG. 4 is a diagram illustrating a modification of the magnetic head slider according to the first embodiment of the invention, which is similar to FIG. 1.

FIG. 4 is a diagram illustrating a modification of the magnetic head slider according to the first embodiment of the invention, which is similar to FIG. 1.

In FIG. 4, the same members as the magnetic head slider 10A shown in FIG. 1 are denoted by the same reference numerals, and the description thereof will be omitted.

In the magnetic head slider 10A shown in FIG. 1, the leading-side peripheral portion 14a of the step surface 14 is located closer to the slider substrate 11 side than a bonding surface P1 between the slider substrate 11 and the shock absorbing layer 20. In contrast, different from the magnetic head slider 10A, in a magnetic head slider 10B according to the present modification, the leading-side peripheral portion 14a is located closer to the shock absorbing layer 20 side than the bonding surface P1. In addition, this point is the difference between the magnetic head slider 10B according the modification and the magnetic head slider 10A according to the first embodiment. Further, the other structure of the magnetic head slider 10B is the same as that of the magnetic head slider 10A.

In the present modification, the step surface 14 has a portion 14A that is provided on the magnetic disk facing surface 11a of the slider substrate 11 and located closer to the shock absorbing layer 20 side than the bonding surface P1 between the slider substrate 11 and the shock absorbing layer 20, and a portion 14B that is provided on the surface of the shock absorbing layer 20 and located closer to the shock absorbing layer 20 side than the bonding surface P1. Further, since the recess r1 is formed at the interface between the slider substrate 11 and the shock absorbing layer 20, each of the portions 14A and 14B has a stepped structure.

Furthermore, in the magnetic head slider 10B according to the present modification, similar to the magnetic head slider 10A according to the first embodiment, the height h of the convex portion and the depth d of the concave portion, which are formed on the surface Da of the magnetic disk D, can be decreased, as compared with a conventional case in which the leading-side end portion L1 of the sliding substrate 11 contacts with the magnetic disk D. That is, it is possible to prevent the magnetic disk D from being damaged.

Figure 5:
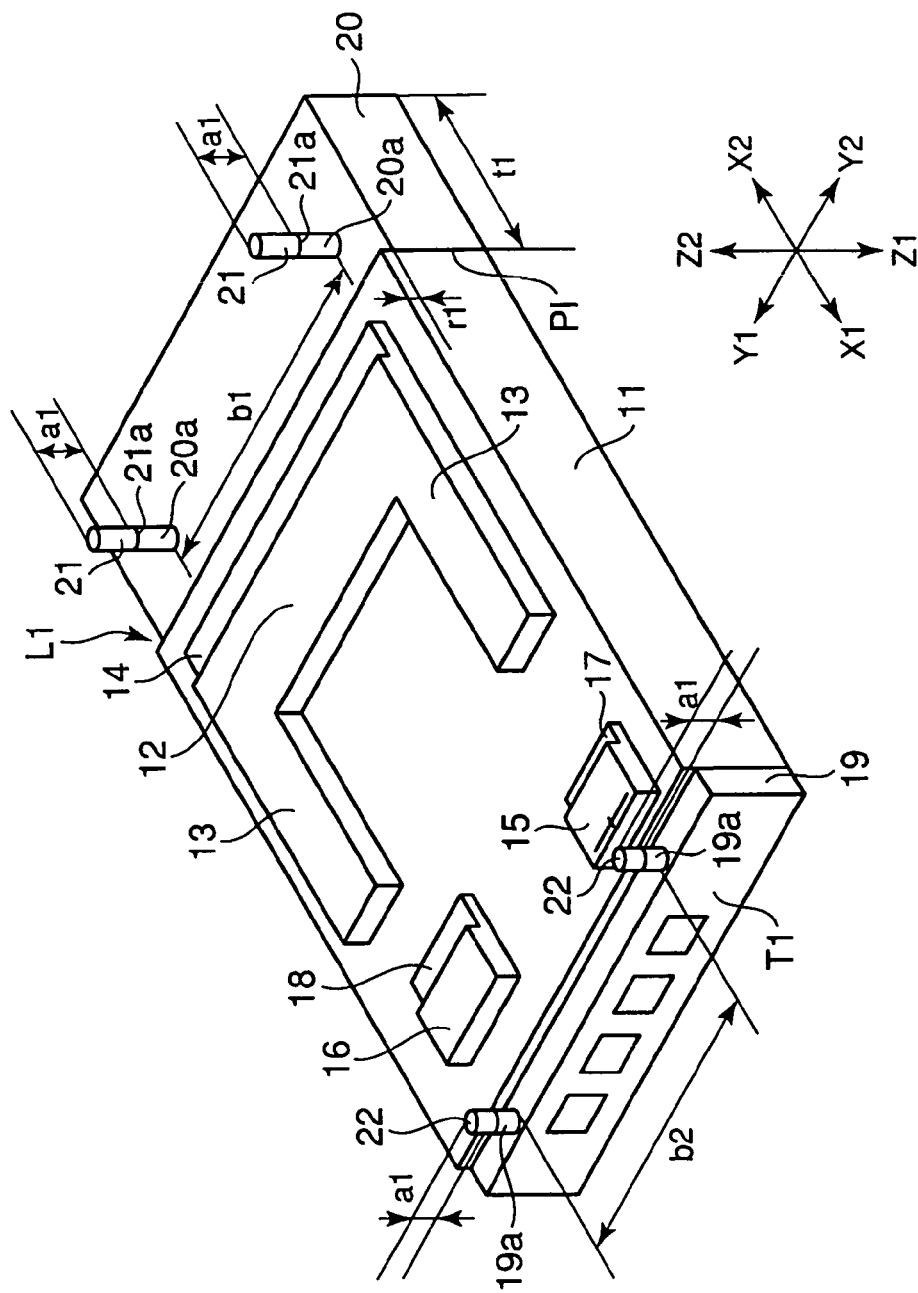
FIG. 5 is a perspective view illustrating a magnetic head slider according to a second embodiment of the invention in a state in which a magnetic disk facing surface is faced up.

FIG. 5 is a perspective view illustrating a magnetic head slider according to a second embodiment of the invention in a state in which a surface of the magnetic head slider opposite to a magnetic disk is faced up.

In FIG. 5, the same members as the magnetic head slider 10A shown in FIG. 1 are denoted by the same reference numerals, and the description thereof will be omitted.

The magnetic head slider 10C according to the second embodiment of the invention is different from the magnetic head slider 10A shown in FIG. 1. That is, in the magnetic head slider 10C, portions of the shock absorbing layers 20 have pillar remaining portions 20a and 20a in a state in which by means of a method of manufacturing the magnetic head slider, which will be described in detail below, such that they do not cut and protrude toward the magnetic disk D rather than the other portions. Further, projecting portions 21 and 21 having pillar shapes, which protrude toward the magnetic disk D, are respectively formed on the surfaces of the remaining portions 20a and 20a as individual members different from the shock absorbing layer 20. Further, on the surface of the protective layer 19, pillar remaining portions 19a and 19a are formed, and protruding portions 22 and 22 having pillar shapes, which protrude toward the magnetic disk D, are respectively formed on the surfaces of the remaining portions 19a and 19a as individual members different from the protective layer 19. This point is the difference between the magnetic head slider 10C according to the second embodiment and the magnetic head slider 10A according to the first embodiment. Further, the other structure of the magnetic head slider 10C is the same as that of the magnetic head slider 10A. Further, by means of a method of manufacturing the magnetic head slider, which will be described in detail below, the projecting portions 21 and 21 may be integrated with the shock absorbing layer 20, and the protruding portions 22 and 22 may be integrated with the protective layer 19.

Each of the projecting portions 21 and 21 is formed of a material, such as $Al_2O_3$, $SiO_2$, or the like, which has hardness lower than that of the slider substrate 11, and has a predetermined height a1. The projecting portions 21 and 21 are formed at a predetermined gap b1. The positions of the bottom surfaces 21a and 21a of the protruding portions 21 and 21 in a heightwise direction (positions of the bottom surfaces 21a and 21a in a direction of Z1-Z2 in the drawing) is the same as those of the leading-side ABS surface 12, the rail surfaces 13 and 13, and the trailing-side ABS surfaces 15 and 16. Therefore, the protruding portions 21 and 21 protrude toward the magnetic disk D by a height a1 rather than the leading-side ABS surface 12, the rail surfaces 13 and 13, and the trailing-side ABS surfaces 15 and 16, that is, the highest position in the slider substrate 11. Further, preferably, each of the projecting portions 21 and 21 is formed by using the same material as the shock absorbing layer 20. In this manner, it is possible to easily form the projecting portions 21 and 21 in a method of manufacturing the magnetic head slider, which will be described in detail below.

The protruding portions 22 and 22 are also formed at a predetermined gap b2, and each of them has a predetermined height a1. Further, the protruding portions 22 and 22 may be formed on the surface of the protective layer 19 of the magnetic head slider 10A shown in FIG. 1 and the surface of the protective layer 19 of the magnetic head slider 10B shown in FIG. 4.

Next, characteristics according to the present embodiment will be described.

If the external force is applied to the load beam 100 of the magnetic head device due to a shock or the like, the magnetic head slider 10C moves upward and downward from a floating posture on the basis of the pivot P. At this time, the leading-side end portion L1 of the slider substrate 11 also moves upward and downward. If the leading-side end portion L1 moves downward, it becomes closer to the magnetic disk D.

According to the present embodiment, since each of the protruding portions 21 and 21 protrudes toward the magnetic disk D rather than the highest position in the slider substrate 11 by the height a1, if the leading-side end portion L1 of the slider substrate 11 becomes closer to the magnetic disk D, the leading-side end portion L1 does not contact with the magnetic disk D, and only the protruding portions 21 and 21 contact with the magnetic disk D. Further, in the present embodiment, each of the projecting portions 21 and 21 is formed of a material which has hardness lower than that of the slider substrate 11. For this reason, the height h of the convex portion and the depth d of the concave portion, which are formed on the surface Da of the magnetic disk D, can be decreased, as compared with the height h of the convex portion and the depth d of the concave portion in a case in which the shock absorbing layer 20 contacts with the magnetic disk D in each of the magnetic head slider 10A shown in FIG. 1 and the magnetic head slider 10B shown in FIG. 4. That is, it is possible to further prevent the magnetic disk D from being damaged.

Further, each of the projecting portions 21 and 21 does not necessarily need to protrude toward the magnetic disk D rather than the highest position of the slider substrate 11, and may protrude toward the magnetic disk D rather than at least the position of the leading-side end portion L1 of the slider substrate 11 in a heightwise direction.

Further, in the present embodiment, it is preferable that the protruding portions 22 and 22 protruding toward the magnetic disk D be formed on the surface of the protective layer 19. If the protruding portions 22 and 22 are formed on the surface of the protective layer 19, an external force is applied to the load beam 100 of the magnetic head device due to the shock or the like, and the trailing-side end portion T1 of the slider substrate 11 moves downward to become closer to the magnetic disk D. In this case, the trailing-side end portion T1 does not contact with the magnetic disk D, and only the protruding portions 22 and 22 contact with the magnetic disk D. For this reason, it is possible to prevent the magnetic disk D from being damaged, as compared with a conventional case in which the trailing-side end portion T1 contacts with the magnetic disk D.

Figure 6:
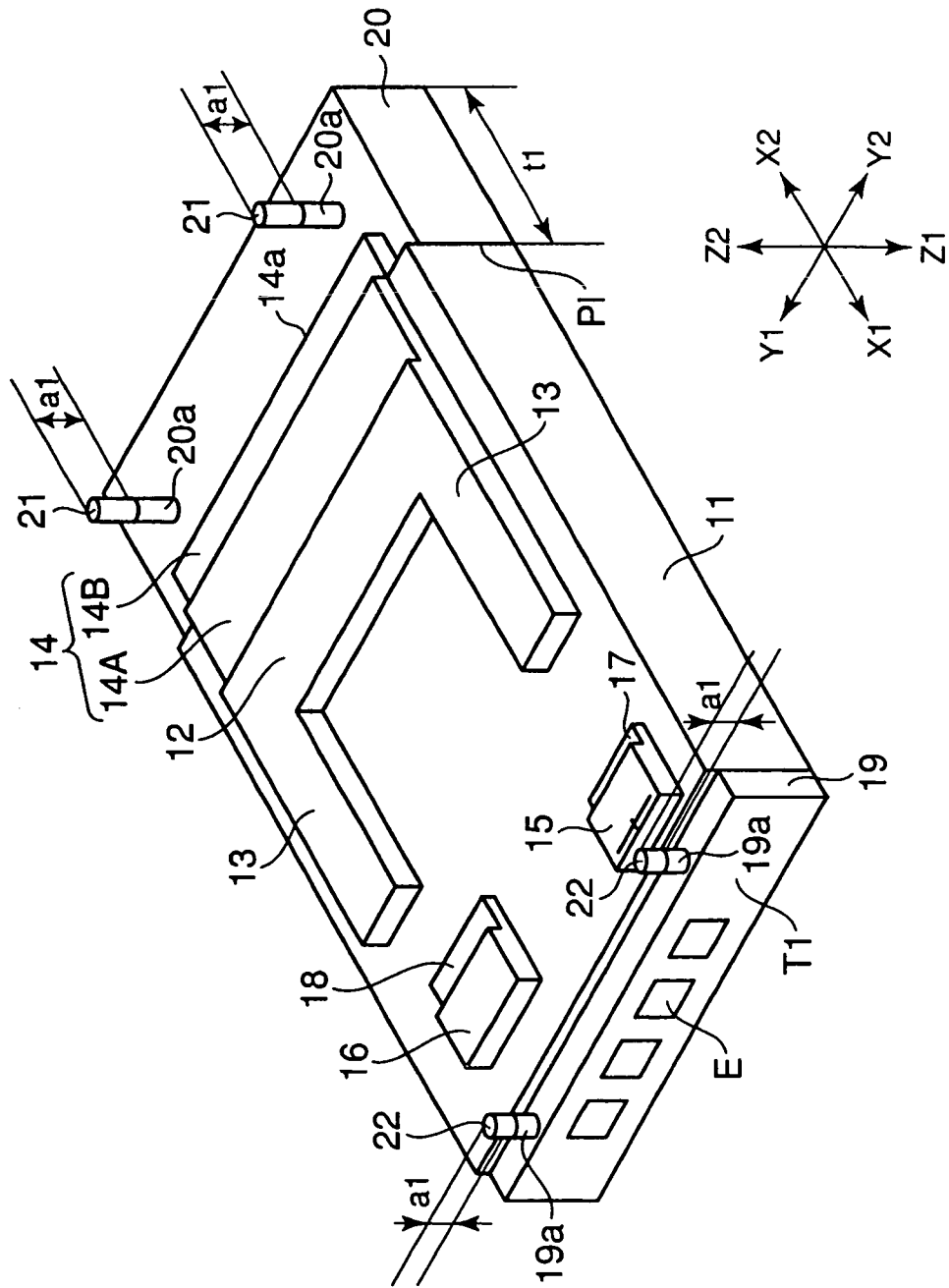
FIG. 6 is a diagram illustrating a modification of the magnetic head slider according to the second embodiment of the invention, which is similar to FIG. 5.

FIG. 6 is a diagram illustrating a modification of the magnetic head slider according to the second embodiment of the invention, which is similar to FIG. 5.

The magnetic head slider 10D according to the present modification has a structure different from that of the magnetic head slider 10C shown in FIG. 5 in which similar to the step surface 14 in the magnetic head slider 10B shown in FIG. 4, the step surface 14 thereof has a leading-side peripheral portion 14a that is located closer to the shock absorbing layer 20 side than a bonding surface P1 between the slider substrate 11 and the shock absorbing layer 20 and portions 14A and 14B, and a step is formed between the portions 14A and 14B. Further, the other structure of the magnetic head slider 10D according to the modification is the same as that of the magnetic head slider 10C shown in FIG. 5. Therefore, in the present modification, the description of the members of the magnetic head slider 10D is not omitted.

Further, in the magnetic head slider 10D according to the present modification, similar to the magnetic head slider 10C, the height h of the convex portion and the depth d of the concave portion, which are formed on the surface Da of the magnetic disk D, can be decreased, as compared with cases in which the shock absorbing layer 20 contacts with the magnetic disk D in each of the magnetic head slider 10A shown in FIG. 1 and the magnetic head slider 10B shown in FIG. 4. That is, it is possible to further prevent the magnetic disk D from being damaged.

Next, a method of manufacturing the magnetic head slider according to the embodiment of the invention will be described.

Figure 7:
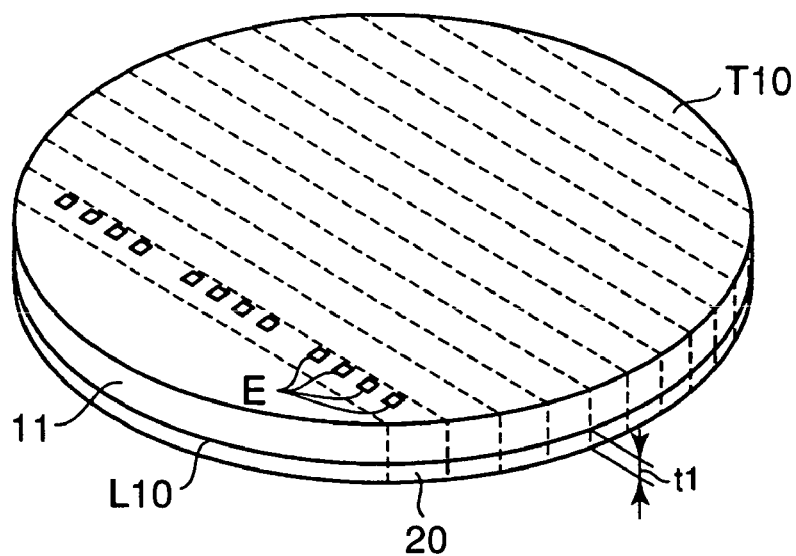
FIG. 7 is perspective view illustrating a state in which magnetic elements and electrodes are laminated on a wafer slider substrate.
Figure 8:
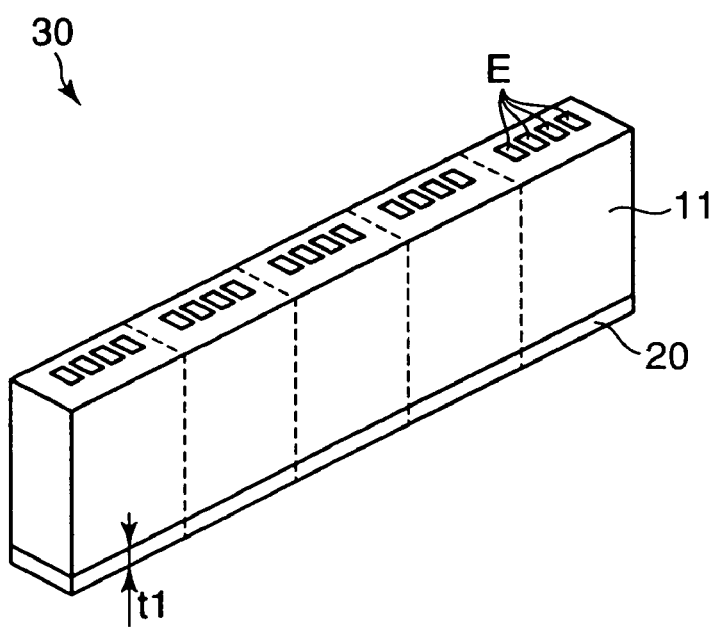
FIG. 8 is a perspective view illustrating a slider bar formed by cutting the slider substrate shown in FIG. 7.

FIG. 7 is perspective view illustrating a state in which magnetic elements and electrodes are laminated on a wafer slider substrate, and FIG. 8 is a perspective view illustrating a slider bar formed by cutting the slider substrate shown in FIG. 7.

First, as shown in FIG. 7, on the trailing-side end face T10 of the wafer slider substrate 11, a plurality of recording and/or reproducing magnetic elements S (not shown) and a plurality of columns of electrodes E (only some of them are shown in FIG. 7) are provided. The plurality of columns of electrodes E is electrically connected to the plurality of recording and/or reproducing magnetic elements S. The shock absorbing layer 20 is provided on the leading-side end face L10 of the wafer slider substrate 11 which is located closer to the side opposite to the side where the magnetic elements S and the electrodes E are formed. The shock absorbing layer 20 is formed of a material, such as $Al_2O_3$, $SiO_2$, or the like, which has hardness lower than that of the slider substrate 11, and the thickness thereof t1 is within a range of 20 to 40 μm. Then, the wafer slider substrate 11 is cut at portions shown by dotted lines, and a slider bar 30 shown in FIG. 8 is formed.

Next, a method of manufacturing the magnetic head slider 10A shown in FIG. 1 will be described.

Figure 9A:
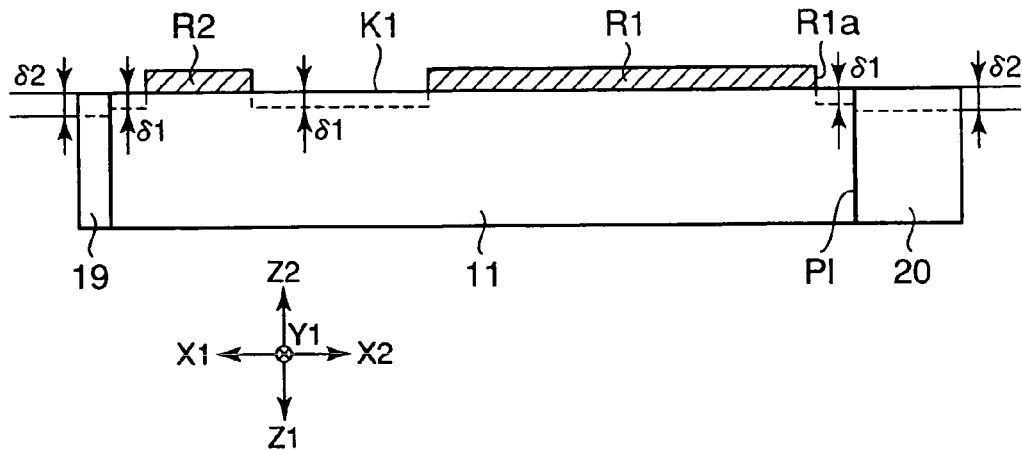
FIG. 9A is a cross-sectional view taken along the line IX-IX of FIG. 1, which illustrates a process of manufacturing the magnetic head slider according to the first embodiment of the invention.
Figure 9B:
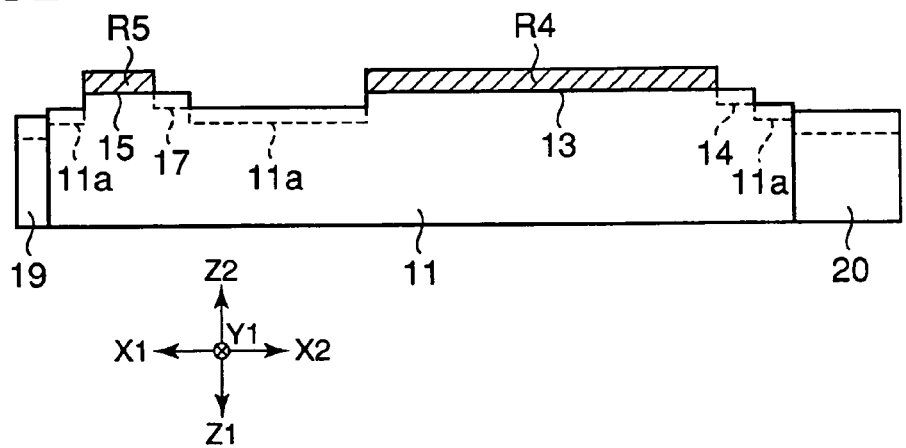
FIG. 9B is a cross-sectional view taken along the line IX-IX of FIG. 1, which illustrates a process of manufacturing the magnetic head slider according to the first embodiment of the invention.
Figure 9C:
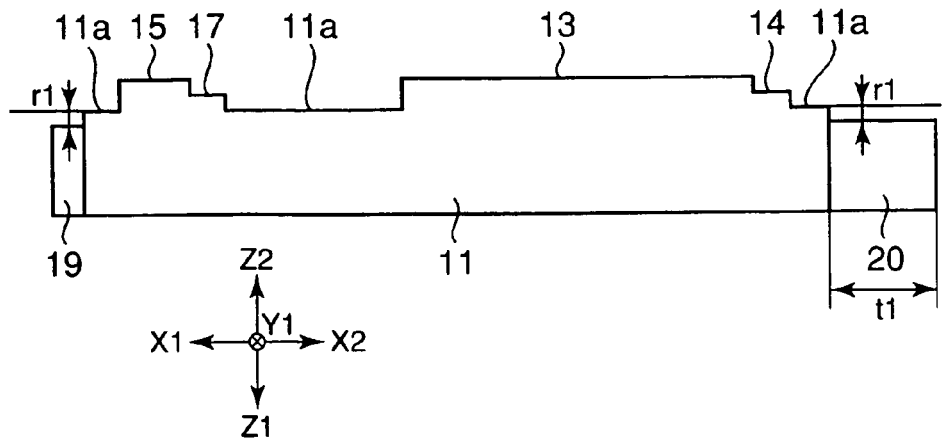
FIG. 9C is a cross-sectional view taken along the line IX-IX of FIG. 1, which illustrates a process of manufacturing the magnetic head slider according to the first embodiment of the invention.

FIGS. 9A to 9C are cross-sectional views taken along the line IX-IX of FIG. 1, each of which illustrates a process of manufacturing the magnetic head slider according to the first embodiment of the invention. In FIGS. 9A and 9B, only resists are hatched.

First, in the slider bar 30 shown in FIG. 8, a portion of the magnetic disk D-side end face K1 of the slider substrate 11, which corresponds to a planar portion including the leading-side ABS surface 12, the rail surfaces 13 and 13, and the step surface 14 shown in FIG. 1, is covered with a resist (mask layer) R1, which is formed by using a resist photolithography technology and has the same shape as the planar portion. That is, the leading-side peripheral portion R1a of the resist R1 is located closer to the slider substrate 11 side than the bonding surface P1 between the slider substrate 11 and the shock absorbing layer 20.

Further, a portion of the magnetic disk D-side end face K1 of the slider substrate 11, which corresponds to a planar portion including the trailing-side ABS surface 15 and the step surface 17 shown in FIG. 1, is covered with a resist R2, which has the same shape as the planar portion. Furthermore, a portion of the magnetic disk D-side end face K1 of the slider substrate 11, which corresponds to a planar portion including the trailing-side ABS surface 16 and the step surface 18 shown in FIG. 1, is covered with a resist, which has the same shape as the planar portion. Then, portions of the protective layer 19, the shock absorbing layer 20, and the slider substrate 11, which are not covered with the resists, are etched.

If the etching process is performed in this manner, the portions of the slider substrate 11, which are not covered with the resists, are cut by a height δ1. In the meanwhile, since each of the protective layer 19 and the shock absorbing layer 20 is formed of a material that has hardness lower than that of the slider substrate 11, the protective layer 19 and the shock absorbing layer 20 are cut by a height δ2 larger than the height δ1. The portions of the slider substrate 11, and the protective layer 19 and the shock absorbing layer 20 are subjected to the cutting process in accordance with the above-mentioned processing principle such that the shapes of them (excluding the resists) shown by a solid line of FIG. 9A are changed to shapes (excluding the resists) shown by a solid line of FIG. 9B.

Next, in the shapes of the portions shown by the solid line of FIG. 9B (excluding the resists), a portion of the magnetic disk D-side end face K1 of the slider substrate 11, which corresponds to a planar portion including the leading-side ABS surface 12 and the rail surfaces 13 and 13 shown in FIG. 1, is covered with a resist R4, which has the same shape as the planar portion. Further, a portion of the magnetic disk D-side end face K1 of the slider substrate 11, which corresponds to the trailing-side ABS surface 15 shown in FIG. 1, is covered with a resist R5, which has the same shape as the planar portion. Furthermore, a portion of the magnetic disk D-side end face K1 of the slider substrate 11, which corresponds to the trailing-side ABS surface 16 shown in FIG. 1, is covered with a resist, which has the same shape as the planar portion. In addition, portions of the protective layer 19, the shock absorbing layer 20, and the slider substrate 11, which are not covered with the resists, are etched.

If the etching process is performed in this manner, the portions of the slider substrate 11, the protective layer 19, and the shock absorbing layer 20, which are not covered with the resists, are cut in accordance with the same processing principle as the above-mentioned processing principle. By performing this process, the leading-side ABS surface 12, the rail surfaces 13 and 13, and the trailing-side ABS surfaces 15 and 16 are formed. In addition, peripheral portions of the leading-side ABS surface 12, the rail surfaces 13 and 13, and the trailing-side ABS surfaces 15 and 16 are cut, so that the step surfaces 14, 17 and 18, and the magnetic disk facing surface 11a are formed. That is, the portions of the slider substrate 11, and the protective layer 19 and the shock absorbing layer 20 are subjected to the cutting process in accordance with the above-mentioned processing principle such that the shapes of them (excluding the resists) shown by a solid line of FIG. 9B are changed to shapes (excluding the resists) shown by a solid line of FIG. 9C where recesses r1 are formed at the interface between the slider substrate 11 and the protective layer 19 and the interface between the slider substrate 11 and the shock absorbing layer 20.

After the leading-side ABS surface 12 or the like is formed as described above, the slider bar 30 is cut at portions shown by dotted lines of FIG. 8, and the magnetic head slider 10A shown in FIG. 1 is manufactured. In the magnetic head slider 10A formed in this manner, the thickness t1 of the shock absorbing layer 20 is within a range of 20 to 40 μm.

Next, a method of manufacturing the magnetic head slider 10B shown in FIG. 4 will be described.

Figure 10A:
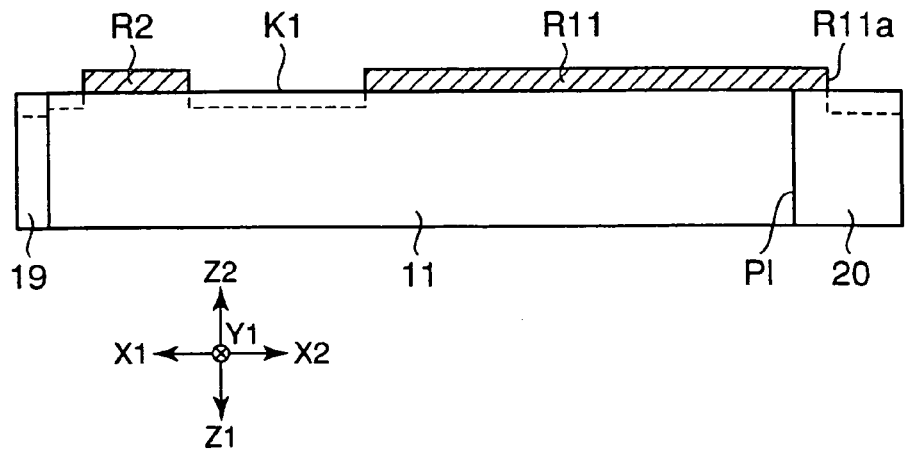
FIG. 10A is a cross-sectional view illustrating a process of manufacturing a magnetic head slider according to a modification of the magnetic head slider according to the first embodiment of the invention.
Figure 10B:
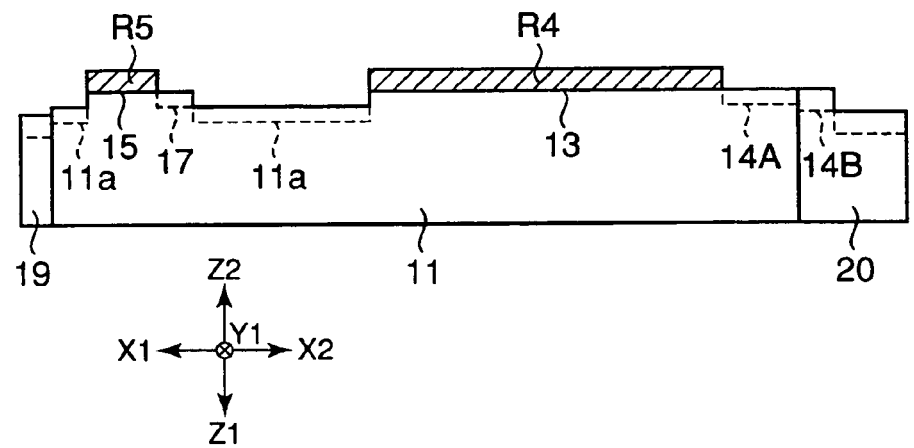
FIG. 10B is a cross-sectional view illustrating a process of manufacturing a magnetic head slider according to a modification of the magnetic head slider according to the first embodiment of the invention.
Figure 10C:
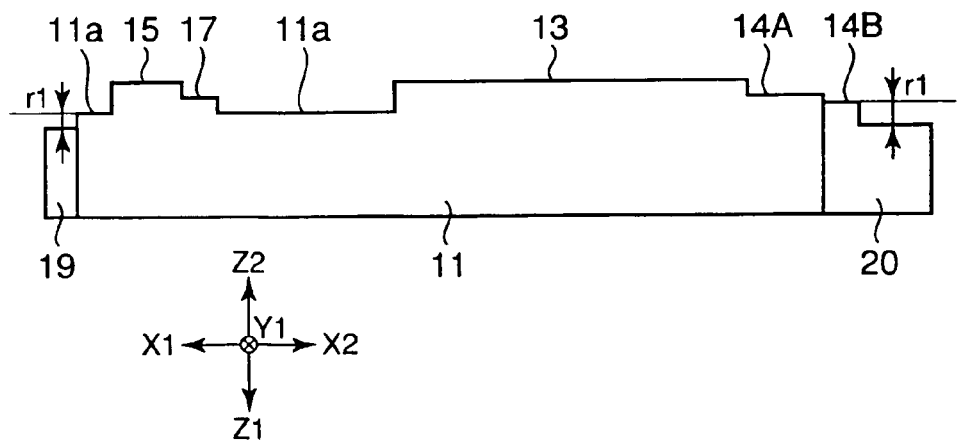
FIG. 10C is a cross-sectional view illustrating a process of manufacturing a magnetic head slider according to a modification of the magnetic head slider according to the first embodiment of the invention.

FIGS. 10A to 10C are cross-sectional views illustrating a process of manufacturing a magnetic head slider according to a modification of the magnetic head slider according to the first embodiment of the invention. In FIGS. 10A and 10B, only resists are hatched.

First, by using the same process as the magnetic head slider 10A, the slider bar 30 shown in FIG. 8 is formed.

Further, in the slider bar 30, a portion of the magnetic disk D-side end face K1 of the slider substrate 11, which corresponds to a planar portion including the leading-side ABS surface 12, the rail surfaces 13 and 13, and the step surface 14 shown in FIG. 4, is covered with a resist R11, which has the same shape as the planar portion. That is, the leading-side peripheral portion R11a of the resist R11 is located closer to the shock absorbing layer 20 than the bonding surface P1 between the slider substrate 11 and the shock absorbing layer 20.

Further, in the same manner as the above-mentioned magnetic head slider 10A, the portions corresponding to the same locations are covered with the resists by using the same method. Furthermore, portions of the protective layer 19, the shock absorbing layer 20, and the slider substrate 11, which are not covered with the resists, are etched.

If the etching process is performed in this manner, the portions of the magnetic disk-side end face K1 of the slider substrate 11, and the protective layer 19 and the shock absorbing layer 20 are subjected to the cutting process in accordance with the same processing principle as the above-mentioned magnetic head slider 10A such that the shapes of them (excluding the resists) shown by a solid line of FIG. 10A are changed to shapes (excluding the resists) shown by a solid line of FIG. 10B.

Next, in the shapes of the portions shown by the solid line of FIG. 10B (excluding the resists), in the same manner as the above-mentioned magnetic head slider 10A, the portions corresponding to the same locations are covered with the resists by using the same method. Furthermore, portions of the protective layer 19, the shock absorbing layer 20, and the slider substrate 11, which are not covered with the resists, are etched.

If the etching process is performed in this manner, the portions of the protective layer 19, the shock absorbing layer 20, and the slider substrate 11, which are not covered with the resists, are cut in accordance with the same processing principle as the above-mentioned processing principle. By performing this process, the leading-side ABS surface 12, the rail surfaces 13 and 13, and the trailing-side ABS surfaces 15 and 16 are formed. In addition, peripheral portions of the leading-side ABS surface 12, the rail surfaces 13 and 13, and the trailing-side ABS surfaces 15 and 16 are cut, so that the step surfaces 14, 17 and 18, and the magnetic disk facing surface 11a are formed. That is, the portions of the slider substrate 11, and the protective layer 19 and the shock absorbing layer 20 are subjected to the cutting process in accordance with the above-mentioned processing principle such that the shapes of them (excluding the resists) shown by a solid line of FIG. 10B are changed to shapes (excluding the resists) shown by a solid line of FIG. 10C where the step surface 14 has portions 14A and 14B.

After the leading-side ABS surface 12 or the like is formed as described above, the slider bar 30 is cut at portions shown by dotted lines of FIG. 8, and the magnetic head slider 10B shown in FIG. 4 is manufactured. In the magnetic head slider 10B formed in this manner, the thickness t1 of the shock absorbing layer 20 is within a range of 20 to 40 μm.

Next, a method of manufacturing the magnetic head slider 10C shown in FIG. 5 will be described.

FIGS. 11A to 11D are cross-sectional views illustrating a process of manufacturing the magnetic head slider according to the second embodiment of the invention. In FIGS. 11A to 11D, only low hardness layers, resists, and projecting portions are hatched.

First, by using the same process as the above-mentioned magnetic head sliders 10A and 10B, the slider bar 30 shown in FIG. 8 is formed.

Figure 11A:
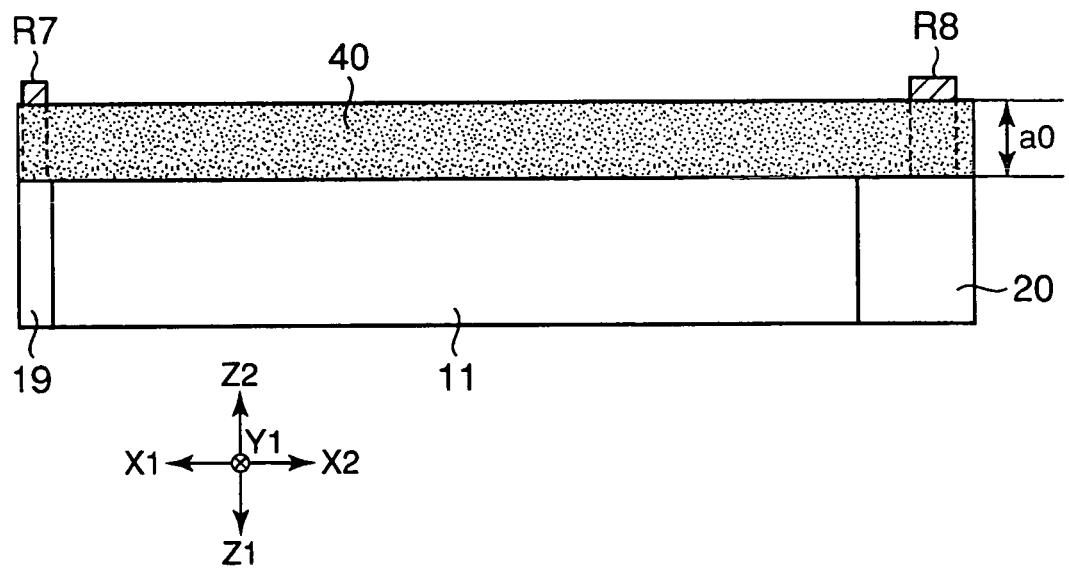
FIG. 11A is a cross-sectional view illustrating a process of manufacturing the magnetic head slider according to the second embodiment of the invention.

Further, as shown in FIG. 11A, on an entire surface of the magnetic disk D-side end face of the slider bar 30, the low hardness layer 40, which is formed of a material, such as $Al_2O_3$ or $SiO_2$, having hardness lower than that of the slider substrate 11, is provided to have a predetermined thickness a0. Then, a predetermined portion of the surface of the low hardness layer 40, which corresponds to the protective layer 19, is covered with the resist R7, and a predetermined portion of the surface of the low hardness layer 40, which corresponds to the shock absorbing layer 20, is covered with the resist R8. In addition, the portions of the surface of the low hardness layer 40, which are not covered with the resists R7 and R8, are etched so as to remove all of the corresponding portions. In this manner, the shape shown in FIG. 11A is changed to a shape (excluding the resists) shown by a solid line in FIG. 11B. That is, on the surface of the shock absorbing layer 20, a projecting portion 21 having a height a0 is formed as a separated member from the shock absorbing layer 20, and on the surface of the protective layer 19, a protruding portion 22 having a height a0 is formed as a separated member from the protective layer 19.

Then, in the same manner as the above-mentioned magnetic head slider 10A, the portions corresponding to the predetermined locations are covered with the resists. Furthermore, portions of the protective layer 19, the shock absorbing layer 20, and the slider substrate 11, which are not covered with the resists, are etched. If the etching process is performed in this manner, the portions of the magnetic disk-side end face K1 of the slider substrate 11, and the protective layer 19 and the shock absorbing layer 20 are subjected to the cutting process in accordance with the same processing principle as the above-mentioned magnetic head slider 10A such that the leading-side ABS surface 12, the rail surfaces 13 and 13, and the trailing-side ABS surfaces 15 and 16 are formed. In addition, peripheral portions of the leading-side ABS surface 12, the rail surfaces 13 and 13, and the trailing-side ABS surfaces 15 and 16 are cut, so that the step surfaces 14, 17 and 18, and the magnetic disk facing surface 11a are formed. Further, the height of each of the projecting portion 21 and the protruding portion 22 is also reduced from a0 to a1. That is, the portions of the slider substrate 11, and the protective layer 19 and the shock absorbing layer 20 are processed from the shapes shown by a solid line of FIG. 11B (excluding the resists) to shapes shown by a solid line of FIG. 11D via shapes shown by a solid line of FIG. 11C (excluding the resists).

After the leading-side ABS surface 12 or the like is formed as described above, the slider bar 30 is cut at portions shown by dotted lines of FIG. 8, and the magnetic head slider 10C shown in FIG. 5 is manufactured. In the magnetic head slider 10C formed in this manner, the thickness t1 of the shock absorbing layer 20 is within a range of 20 to 40 μm.

Further, each of the projecting portions 21 is preferably formed of the same material as the shock absorbing layer 20. By using the same material as the shock absorbing layer 20, the projecting portions 21 can be easily formed.

Figure 12A:
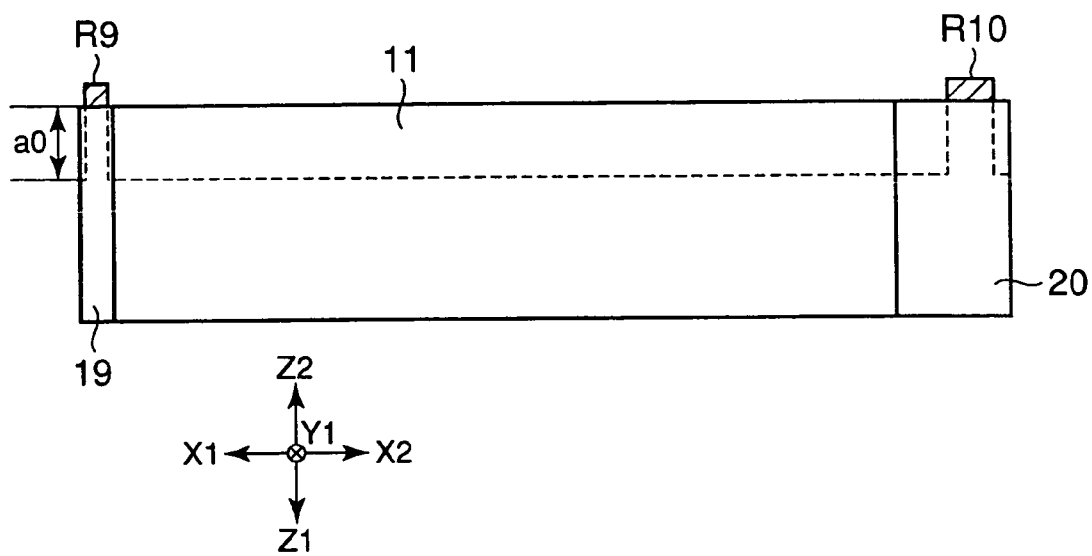
FIG. 12A is a cross-sectional view illustrating another process of manufacturing the magnetic head slider according to the second embodiment of the invention.
Figure 12B:
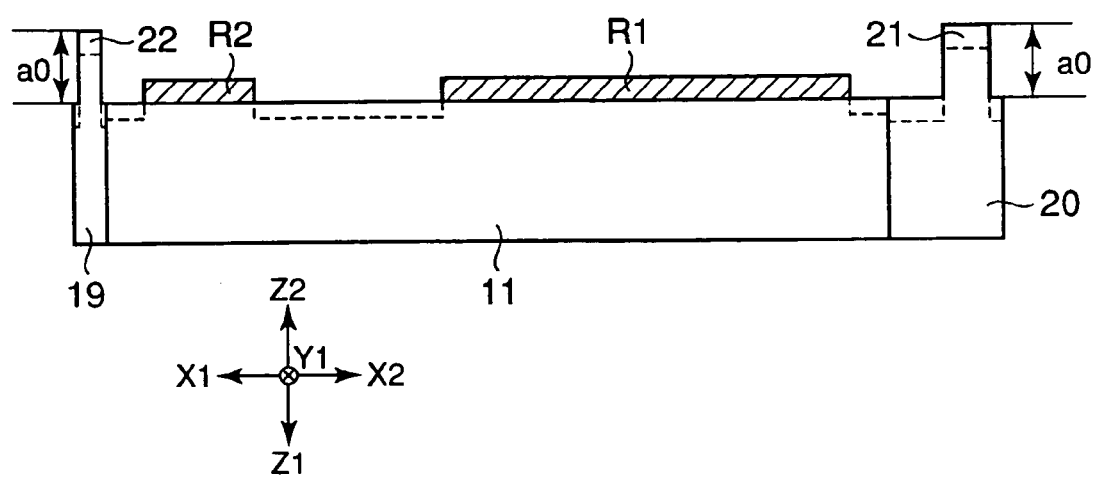
FIG. 12B is a cross-sectional view illustrating another process of manufacturing the magnetic head slider according to the second embodiment of the invention.
Figure 12C:
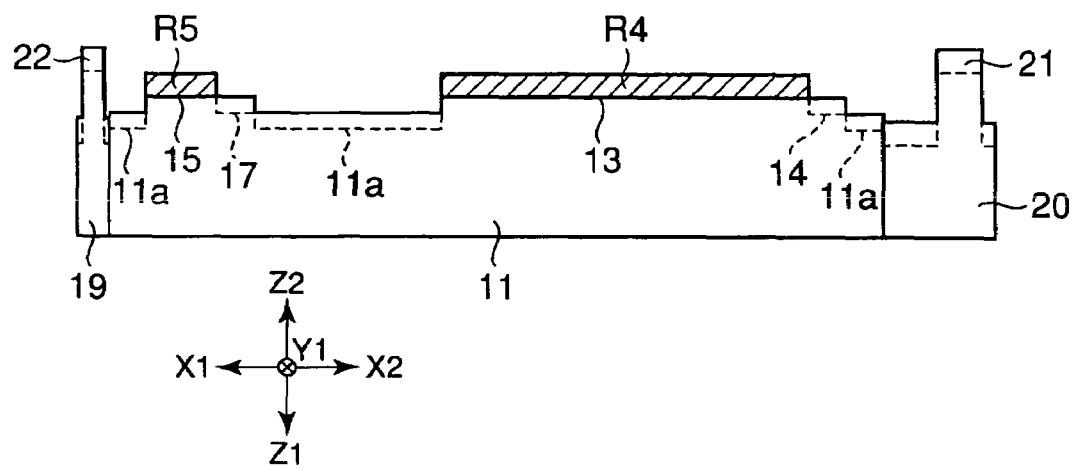
FIG. 12C is a cross-sectional view illustrating another process of manufacturing the magnetic head slider according to the second embodiment of the invention.

FIGS. 12A to 12C are cross-sectional views illustrating another process of manufacturing the magnetic head slider according to the second embodiment of the invention. In addition, in FIGS. 12A to 12C, only resists are hatched.

In this method of manufacturing the magnetic head slider, different from the method of FIGS. 11A to 11D, first, the slider bar 30 is formed to have a thickness which is larger than that of FIGS. 11A to 11D by a thickness a0. By forming the slider bar 30 to be thicker by the thickness a0, the slider bar 30 has a shape shown by a solid line of FIG. 12A (excluding the resists).

Then, the predetermined portion of the surface of the protective layer 19 is covered with the resist R9, and the predetermined portion of the surface of the shock absorbing layer 20 is covered with the resist R10. In addition, the portions of the protective layer 19, the shock absorbing layer 20, and the slider substrate 11, which are not covered with the resists R9 and R10, are etched, and the shape shown in FIG. 12A is changed to the shape shown by a solid line in FIG. 12B (excluding the resists). As a result, a part of the protective layer 19 becomes a protruding portion 22 protruding toward the magnetic disk D, and a part of the shock absorbing layer 20 becomes a projecting portion 21 protruding toward the magnetic disk D.

Figure 11B:
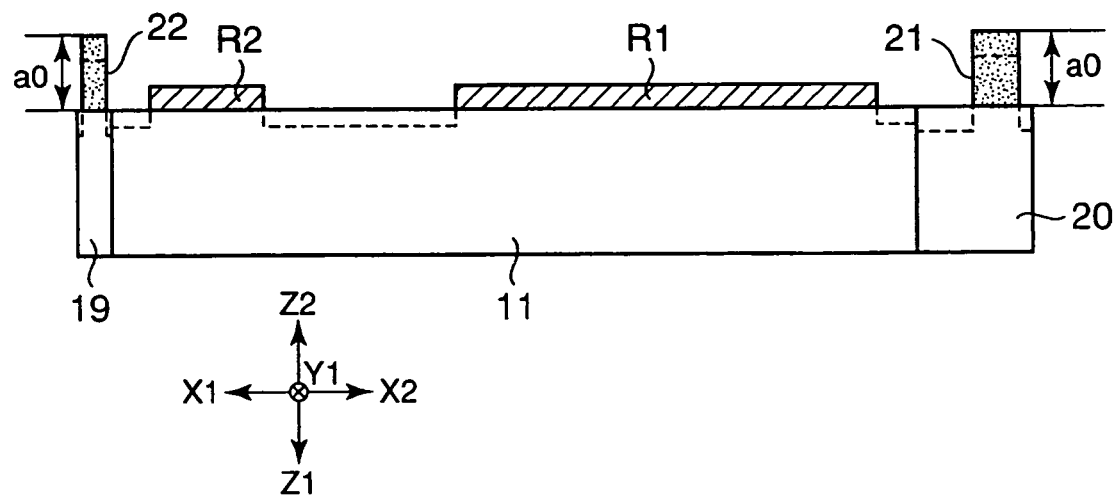
FIG. 11B is a cross-sectional view illustrating a process of manufacturing the magnetic head slider according to the second embodiment of the invention.
Figure 11C:
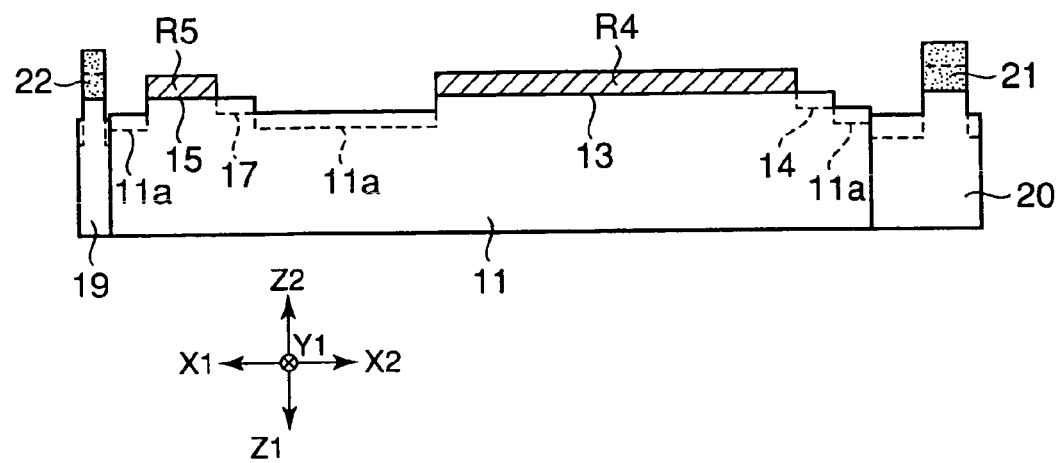
FIG. 11C is a cross-sectional view illustrating a process of manufacturing the magnetic head slider according to the second embodiment of the invention.
Figure 11D:
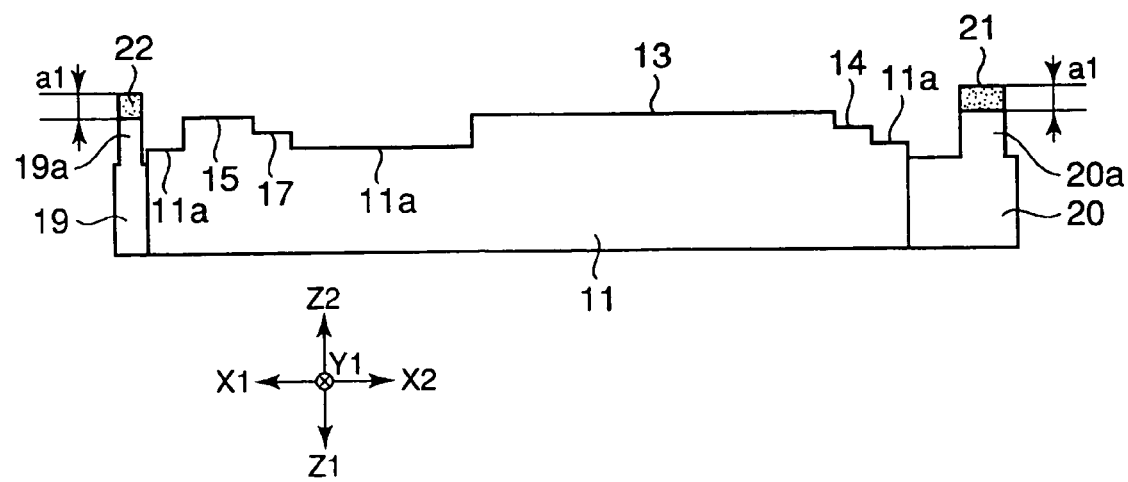
FIG. 11D is a cross-sectional view illustrating a process of manufacturing the magnetic head slider according to the second embodiment of the invention.
Figure 12D:
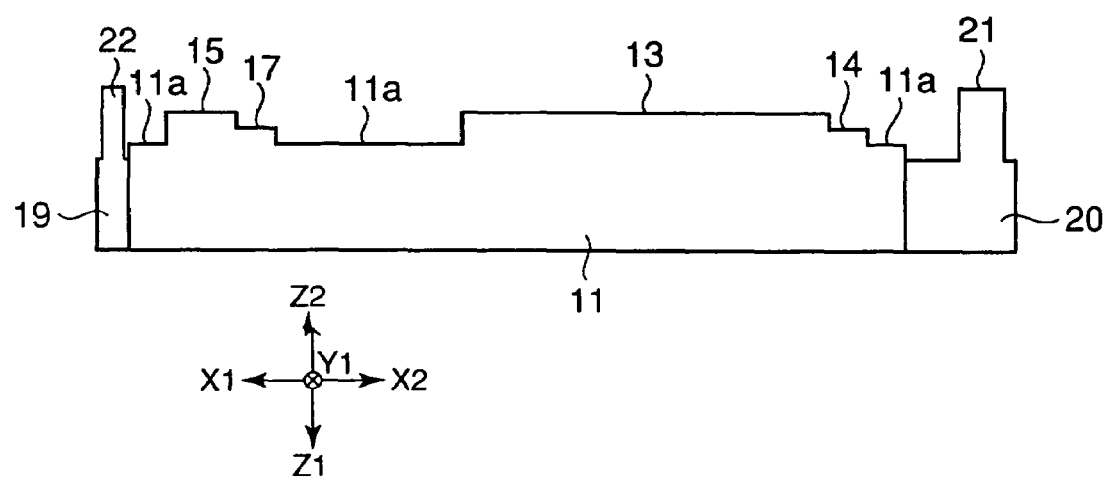
FIG. 12D is a cross-sectional view illustrating another process of manufacturing the magnetic head slider according to the second embodiment of the invention.

Then, in the same manner as the cases of FIGS. 11B to 11D, the portions corresponding to the predetermined locations are covered with the resists by using the same method. Furthermore, portions of the protective layer 19, the shock absorbing layer 20, and the slider substrate 11, which are not covered with the resists, are etched. If the etching process is performed in this manner, the portions of the magnetic disk-side end face K1 of the slider substrate 11, and the protective layer 19 and the shock absorbing layer 20 are subjected to the cutting process in accordance with the same processing principle as the cases of FIGS. 11B to 11D such that the leading-side ABS surface 12, the rail surfaces 13 and 13, and the trailing-side ABS surfaces 15 and 16 are formed. In addition, peripheral portions of the leading-side ABS surface 12, the rail surfaces 13 and 13, and the trailing-side ABS surfaces 15 and 16 are cut, so that the step surfaces 14, 17 and 18, and the magnetic disk facing surface 11a are formed. That is, the portions of the slider substrate 11, and the protective layer 19 and the shock absorbing layer 20 are processed such that the shapes of the them are changed from the shapes shown by a solid line of FIG. 12B (excluding the resists) to shapes shown by a solid line of FIG. 12D via shapes shown by a solid line of FIG. 12C (excluding the resists).

Figure 13:
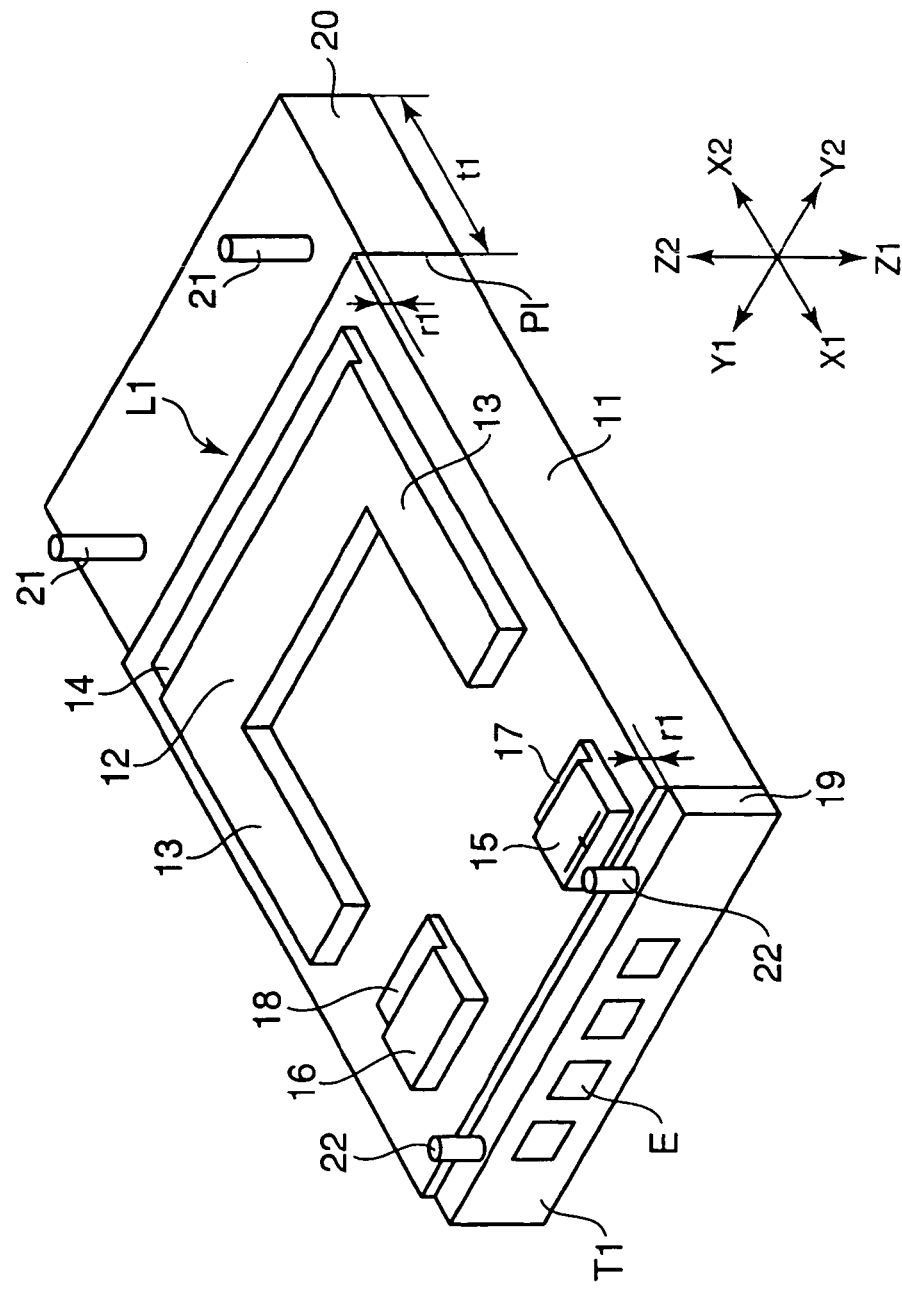
FIG. 13 is a perspective view illustrating the magnetic head slider manufactured by the processes of FIGS. 12A to 12D.

After the leading-side ABS surface 12 or the like is formed as described above, the slider bar 30 is cut at portions shown by dotted lines of FIG. 8, and the magnetic head slider 10C shown in FIG. 13 is manufactured. FIG. 13 is a perspective view illustrating the magnetic head slider 10E manufactured by the processes of FIGS. 12A to 12D. In the magnetic head slider 10E formed in this manner, the thickness t1 of the shock absorbing layer 20 is within a range of 20 to 40 μm.

In the method of manufacturing the magnetic head slider 10E, only performing the etching process can form the projecting portions 21. Therefore, it is possible to easily form the projecting portions 21 and the magnetic head slider 10C having the projecting portions 21.

Next, a method of manufacturing the magnetic head slider 10D shown in FIG. 6 will be described.

Figure 14A:
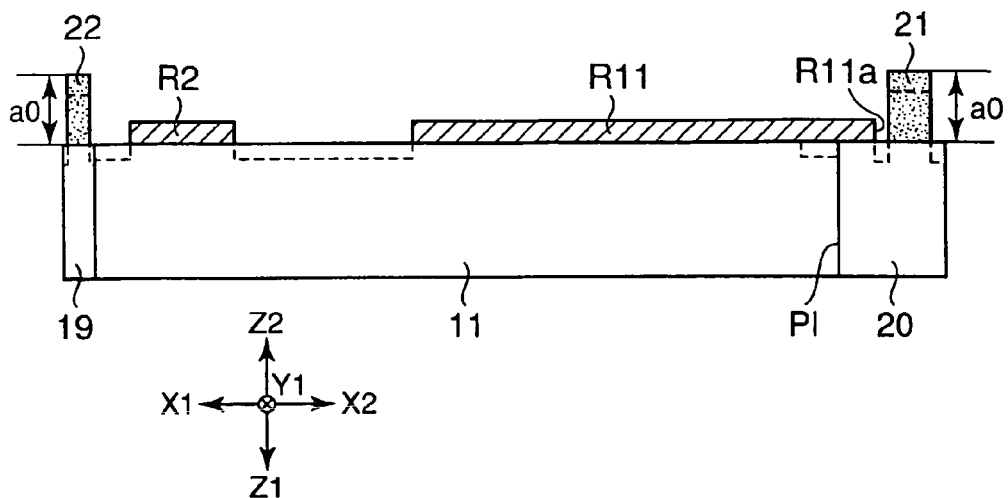
FIG. 14A is a cross-sectional view illustrating a process of manufacturing a magnetic head slider according to a modification of the magnetic head slider according to the second embodiment of the invention.
Figure 14B:
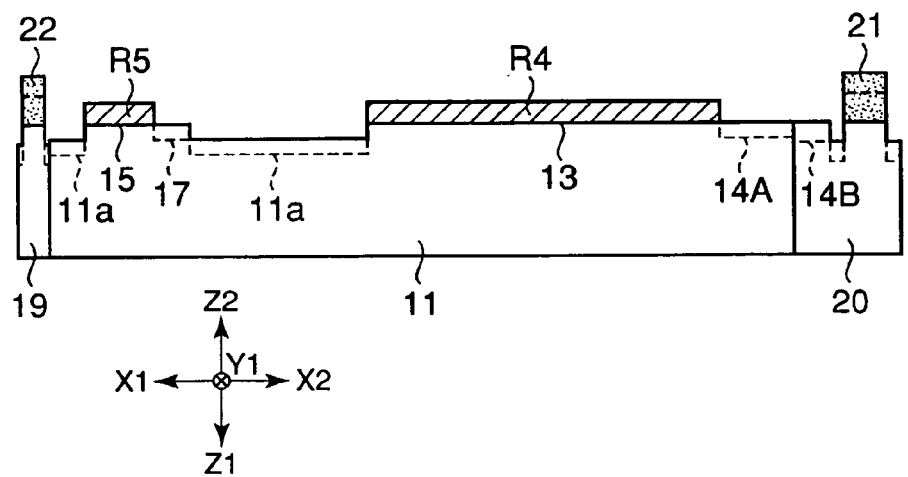
FIG. 14B is a cross-sectional view illustrating a process of manufacturing a magnetic head slider according to a modification of the magnetic head slider according to the second embodiment of the invention.
Figure 14C:
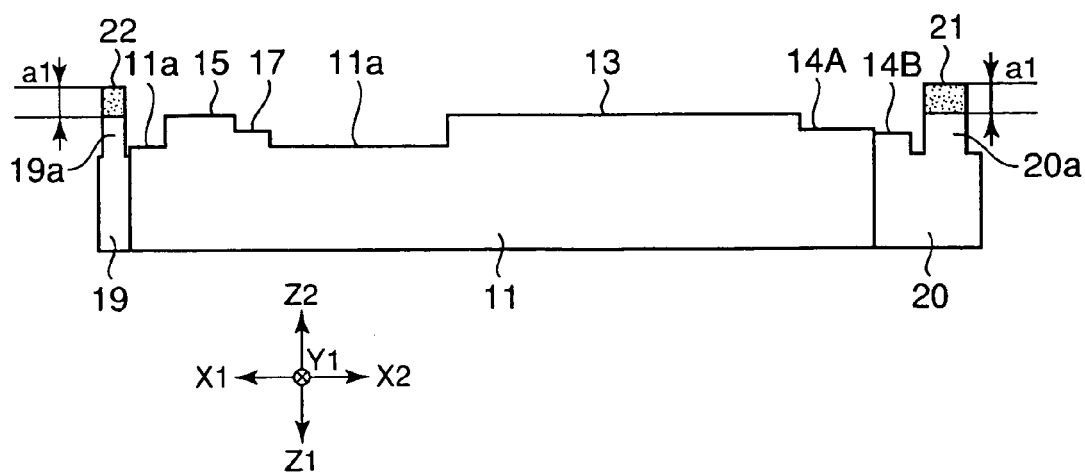
FIG. 14C is a cross-sectional view illustrating a process of manufacturing a magnetic head slider according to a modification of the magnetic head slider according to the second embodiment of the invention.

FIGS. 14A to 14C are cross-sectional views illustrating a process of manufacturing a magnetic head slider according to a modification of the magnetic head slider according to the second embodiment of the invention. In FIGS. 14A to 14C, only resists and projecting portions are hatched.

First, by means of the same processes as the magnetic head sliders 10A to 10C, the slider bar 30 shown in FIG. 8 is formed. In addition, by means of the same process as that in FIG. 11A, on an entire surface of the magnetic disk D-side end face of the slider bar 30, the low hardness layer 40, which is formed of a material, such as $Al_2O_3$ or $SiO_2$, having hardness lower than that of the slider substrate 11, is provided to have a predetermined thickness a0. Then, by performing the etching process using the resists, on the surface of the shock absorbing layer 20, the projecting portion 21 having a height a0 is formed as a separate member from the shock absorbing layer 20. In addition, on the surface of the protective layer 19, the protruding portion 22 having the height a0 is formed as a separate member from the protective layer 19. In this manner, the shape shown by a solid line of FIG. 14A (excluding the resists) is obtained.

Then, in the same manner as the magnetic head slider 10B, the portions corresponding to the predetermined locations are covered with the resists. That is, different from the case of FIG. 11B, the leading-side peripheral portion R11a of the resist R11 is located closer to the shock absorbing layer 20 side than the bonding surface P1 between the slider substrate 11 and the shock absorbing layer 20, as shown in FIG. 14A. In addition, the portions of the slider substrate 11, the protective layer 19, and the shock absorbing layer 20, which are not covered with the resists, are etched so as to remove all of the corresponding portions. In this manner, by means of the same processing principle as the cases of FIGS. 10A to 10C, and FIGS. 11A to 11D, the leading-side ABS surface 12, the rail surfaces 13 and 13, and the trailing-side ABS surfaces 15 and 16 are formed. In addition, peripheral portions of the leading-side ABS surface 12, the rail surfaces 13 and 13, and the trailing-side ABS surfaces 15 and 16 are cut, so that the step surfaces 14, 17 and 18, and the magnetic disk facing surface 11a are formed. Further, the height of each of the projecting portion 21 and the protruding portion 22 is reduced from a0 to a1. That is, the portions of the slider substrate 11, and the protective layer 19 and the shock absorbing layer 20 are processed such that shapes of them are changed from the shapes shown by a solid line of FIG. 14A (excluding the resists) to shapes shown by a solid line of FIG. 14C via shapes shown by a solid line of FIG. 14B (excluding the resists). In FIG. 14C, the step surface 14 has the portions 14A and 14B.

After the leading-side ABS surface 12 or the like is formed as described above, the slider bar 30 is cut at portions shown by dotted lines of FIG. 8, and the magnetic head slider 10D shown in FIG. 6 is manufactured.

Further, each of the projecting portions 21 and 21 is preferably formed of the same material as the shock absorbing layer 20. By using the same material as the shock absorbing layer 20, the projecting portions 21 and 21 can be easily formed.

In this case, in the processes shown in FIG. 14A, the portion covered with the resist R11 may be deformed.

Figure 15:
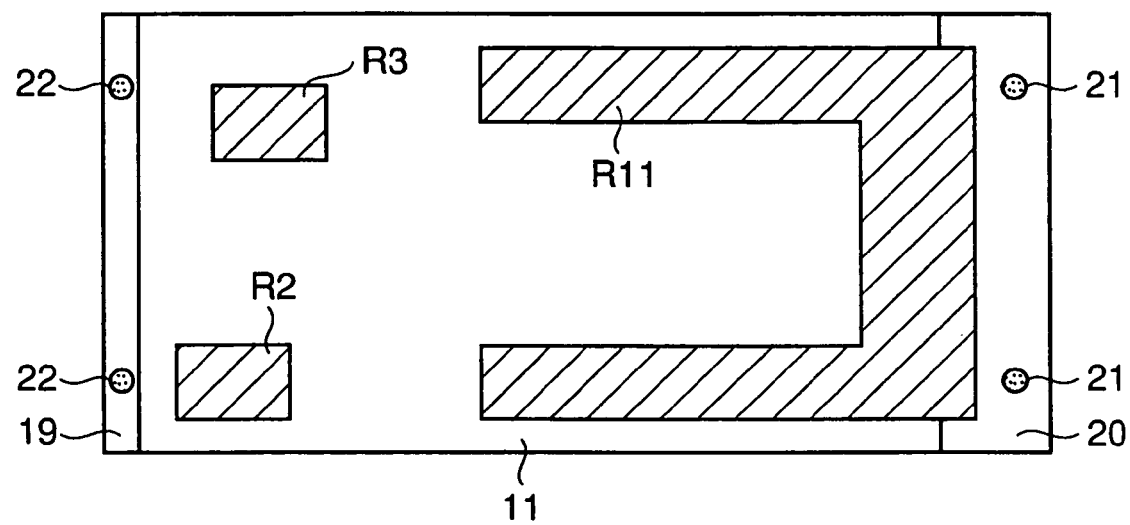
FIG. 15 is a plan view illustrating a method of covering a resist in FIG. 14A.
Figure 15:
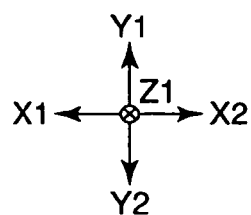
Figure 16:
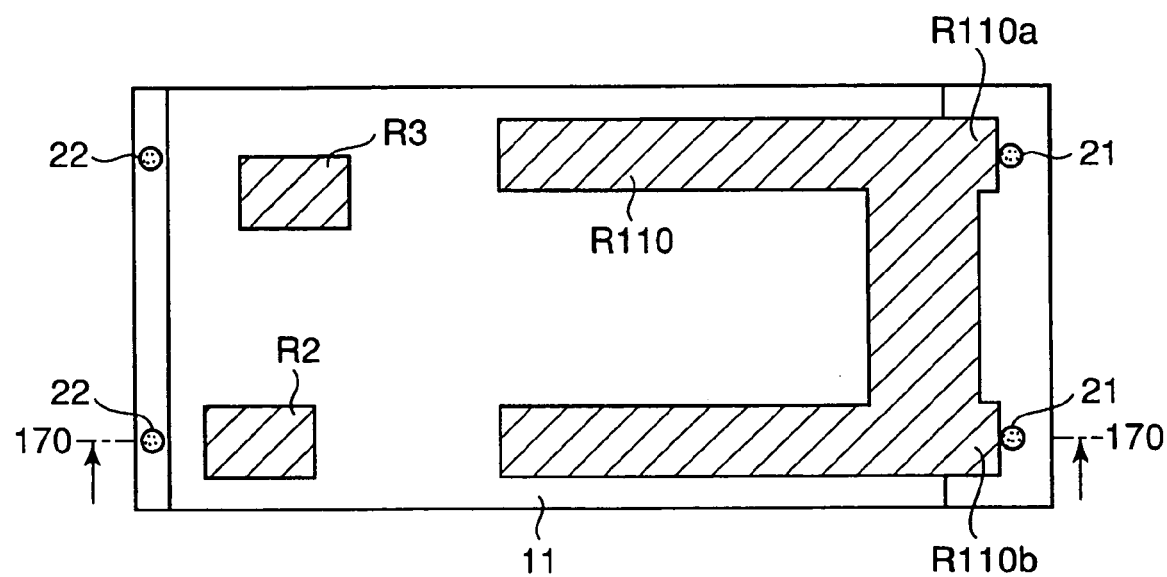
FIG. 16 is a plan view illustrating a modification of the method of covering the resist.
Figure 17A:
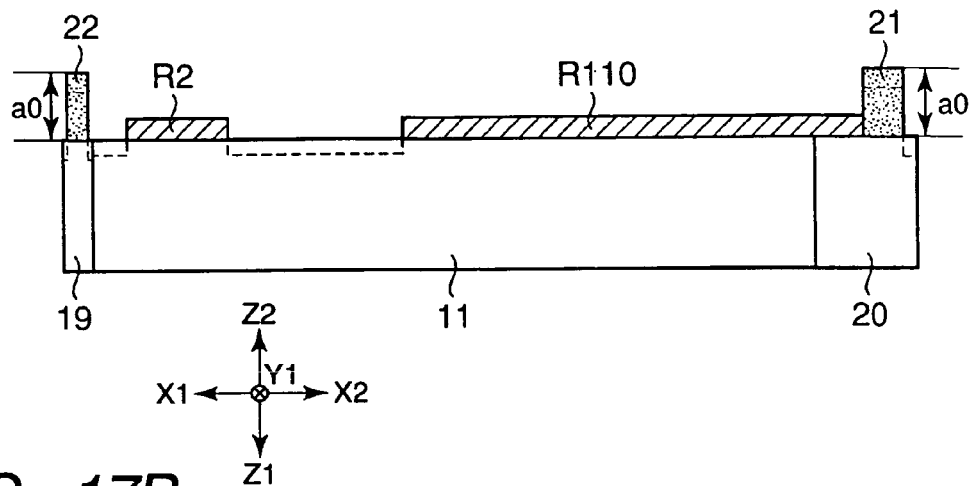
FIG. 17A is a cross-sectional view taken along the line XVII-XVII of FIG. 16, which illustrates a process after the process of manufacturing the magnetic head slider illustrated in FIG. 16.
Figure 17B:
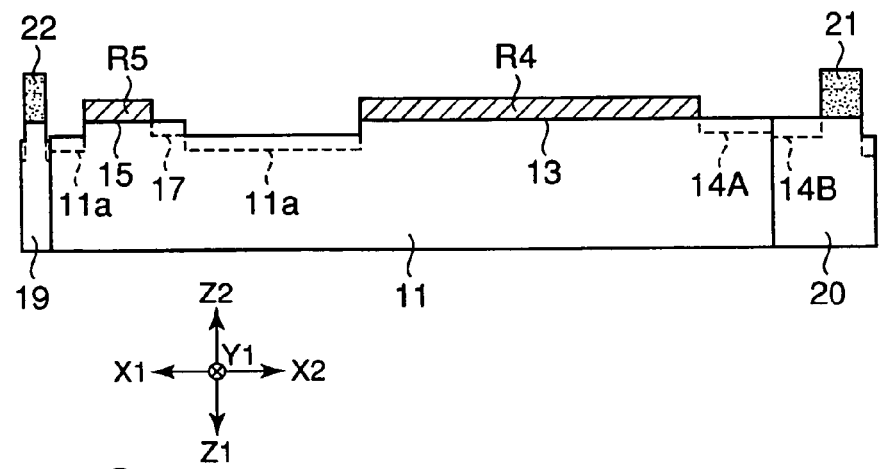
FIG. 17B is a cross-sectional view taken along the line XVII-XVII of FIG. 16, which illustrates a process after the process of manufacturing the magnetic head slider illustrated in FIG. 16.
Figure 17C:
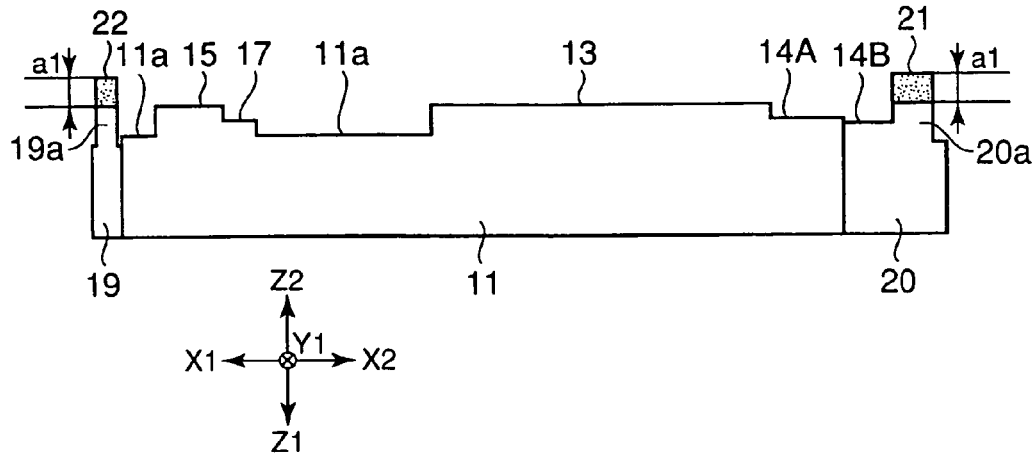
FIG. 17C is a cross-sectional view taken along the line XVII-XVII of FIG. 16, which illustrates a process after the process of manufacturing the magnetic head slider illustrated in FIG. 16.

FIG. 15 is a plan view illustrating a method of covering resists shown in FIG. 14A, FIG. 16 is a plan view illustrating a modification of the method of covering the resist, and FIGS. 17A to 17C are cross-sectional views taken along the line XVII-XVII of FIG. 16, each of which illustrates a process after the process of manufacturing the magnetic head slider illustrated in FIG. 16. In addition, in FIGS. 17A to 17C, only resists and projecting portions are hatched.

In the present modification, in the process illustrated in FIG. 14A, portions corresponding to the predetermined locations are covered with the resist R110, which has a planer shape different from that of the resist R11, as shown in FIG. 16.

The planer shape of the resist R110 is a U shape which is the same shape as the resist R11 shown in FIG. 15. As shown in FIG. 16, the resist R110 has extending portions R110a and R110b which extend toward the projecting portions 21 and 21. The extending portions R110a and R110b are formed at both ends of the resist R110 in the width direction. In addition, as shown in FIGS. 16 and 17A, front end portions of the extending portions R110a and R110b reach bottom portions of the protruding portions 21 and 21, respectively, such that the extending portions R110a and R110b come into contact with the projecting portions 21 and 21.

After the corresponding portions are covered with the resist R110, in the same manner as the processes shown in FIGS. 14B and 14C, the portions of the protective layer 19, the shock absorbing layer 20, and the slider substrate 11, which are not covered with the resist R110, are etched. By performing the etching process in this manner, the portions of the slider substrate 11, and the protective layer 19 and the shock absorbing layer 20 are processed in accordance with the same processing principle as FIGS. 14B and 14C such that the shapes of them are changed from the shapes shown by a solid line of FIG. 17A (excluding the resists) to shapes shown by a solid line of FIG. 17C via shapes shown by a solid line of FIG. 17B (excluding the resists). In FIG. 17C, the step surface 14 has the portions 14A and 14B.

Figure 18:
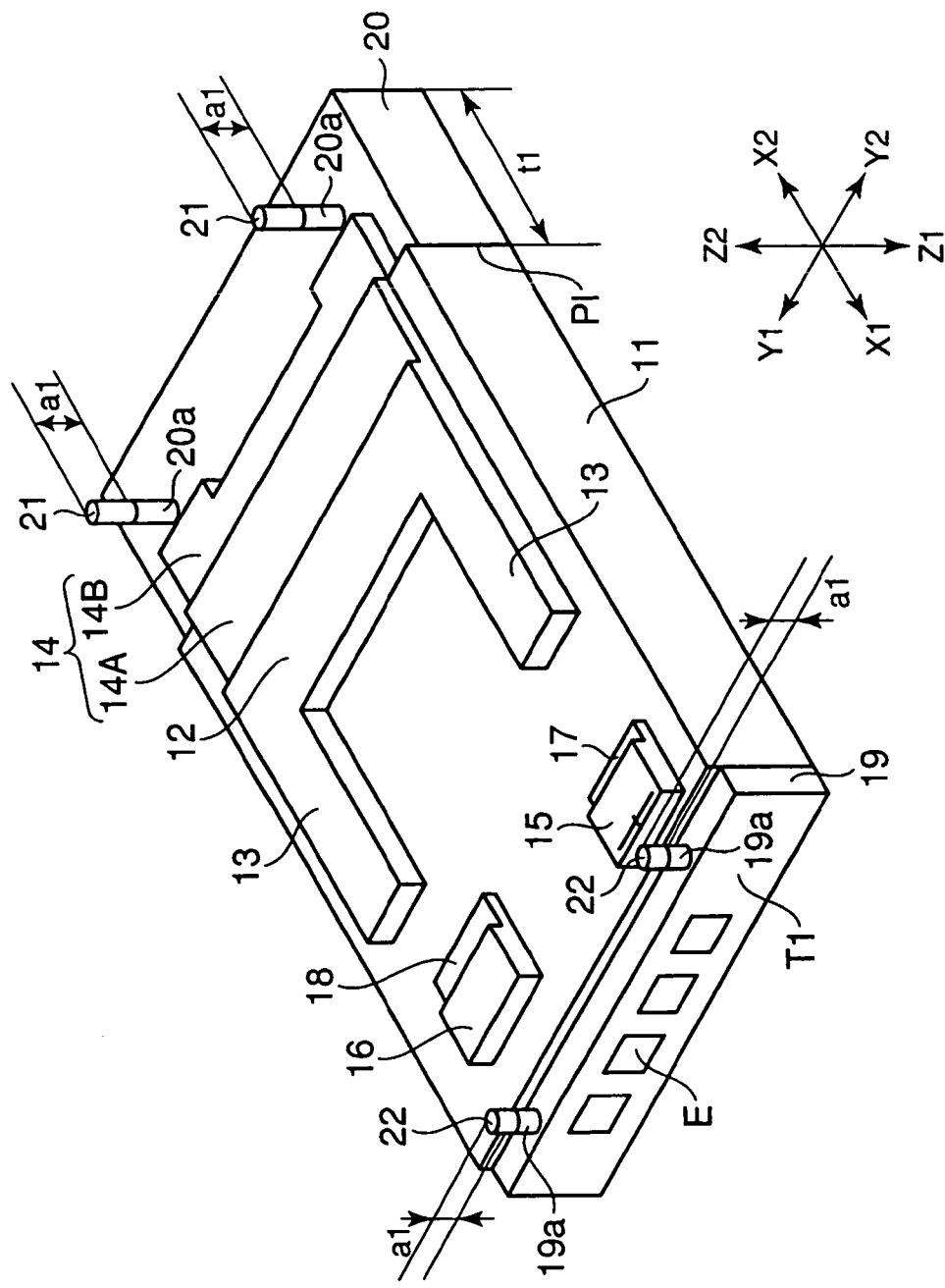
FIG. 18 is a perspective view illustrating a magnetic head slider manufactured by the processes of FIGS. 16 and 17A to 17C.

After the leading-side ABS surface 12 or the like is formed as described above, the slider bar 30 is cut at portions shown by dotted lines of FIG. 8, and the magnetic head slider 10D1 shown in FIG. 18 is manufactured. FIG. 18 is a perspective view illustrating the magnetic head slider 10D1 manufactured by the processes of FIGS. 16 and 17A to 17C.

As shown in FIG. 17C, the magnetic head slider 10D1 is different from the magnetic head slider 10D shown in FIG. 14C, and the portion 14B of the step surface 14 is connected to the bottom surface of the protruding portion of the shock absorbing layer 20 which is located closer to a position than that of each of the projecting portions 21 and 21.

Figure 19A:
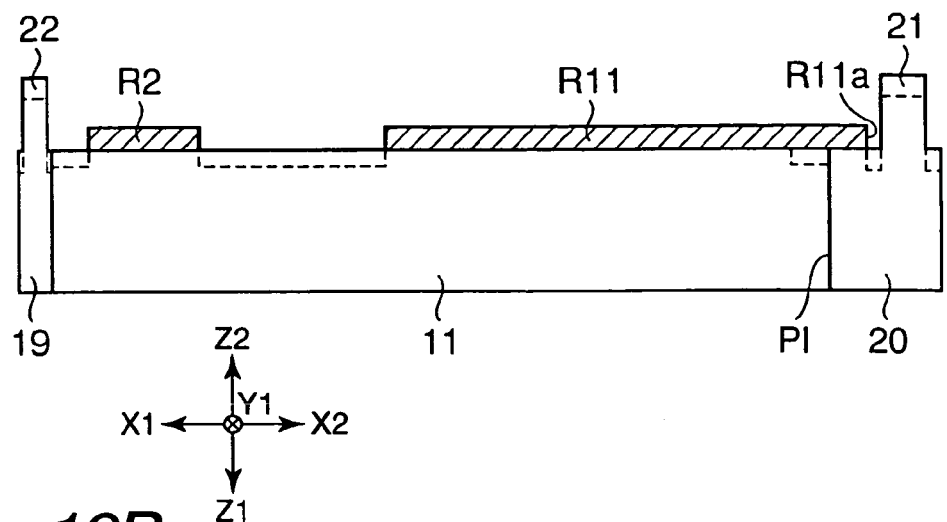
FIG. 19A is a cross-sectional view illustrating another process of manufacturing a magnetic head slider according to a modification of the magnetic head slider according to the second embodiment of the invention.
Figure 19B:
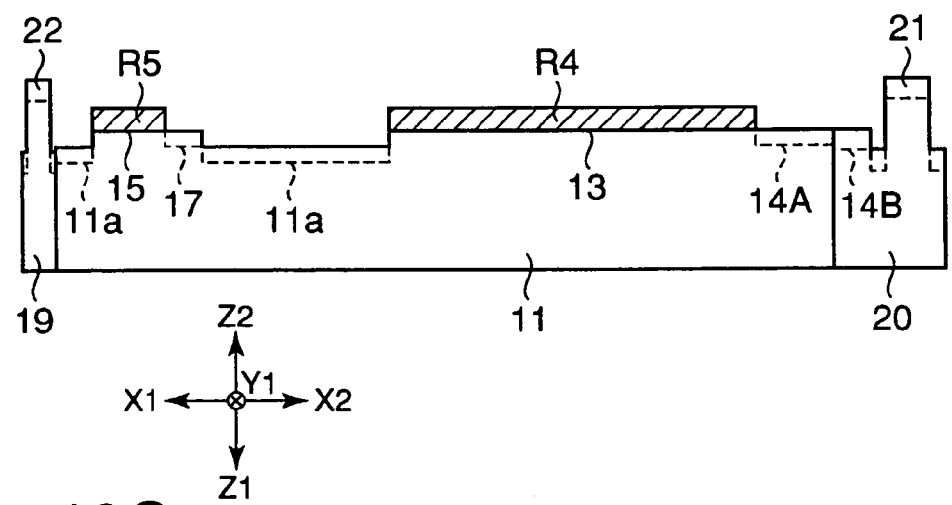
FIG. 19B is a cross-sectional view illustrating another process of manufacturing a magnetic head slider according to a modification of the magnetic head slider according to the second embodiment of the invention.
Figure 19C:
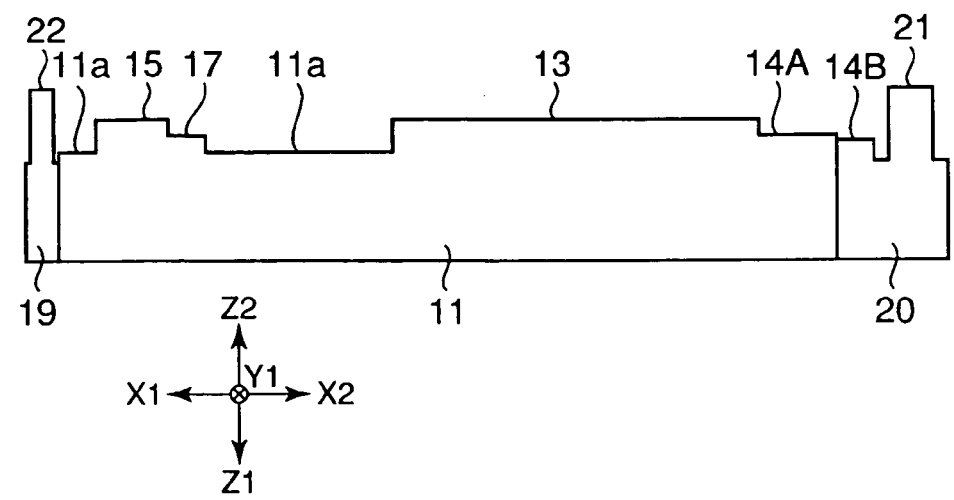
FIG. 19C is a cross-sectional view illustrating another process of manufacturing a magnetic head slider according to a modification of the magnetic head slider according to the second embodiment of the invention.
Figure 20:
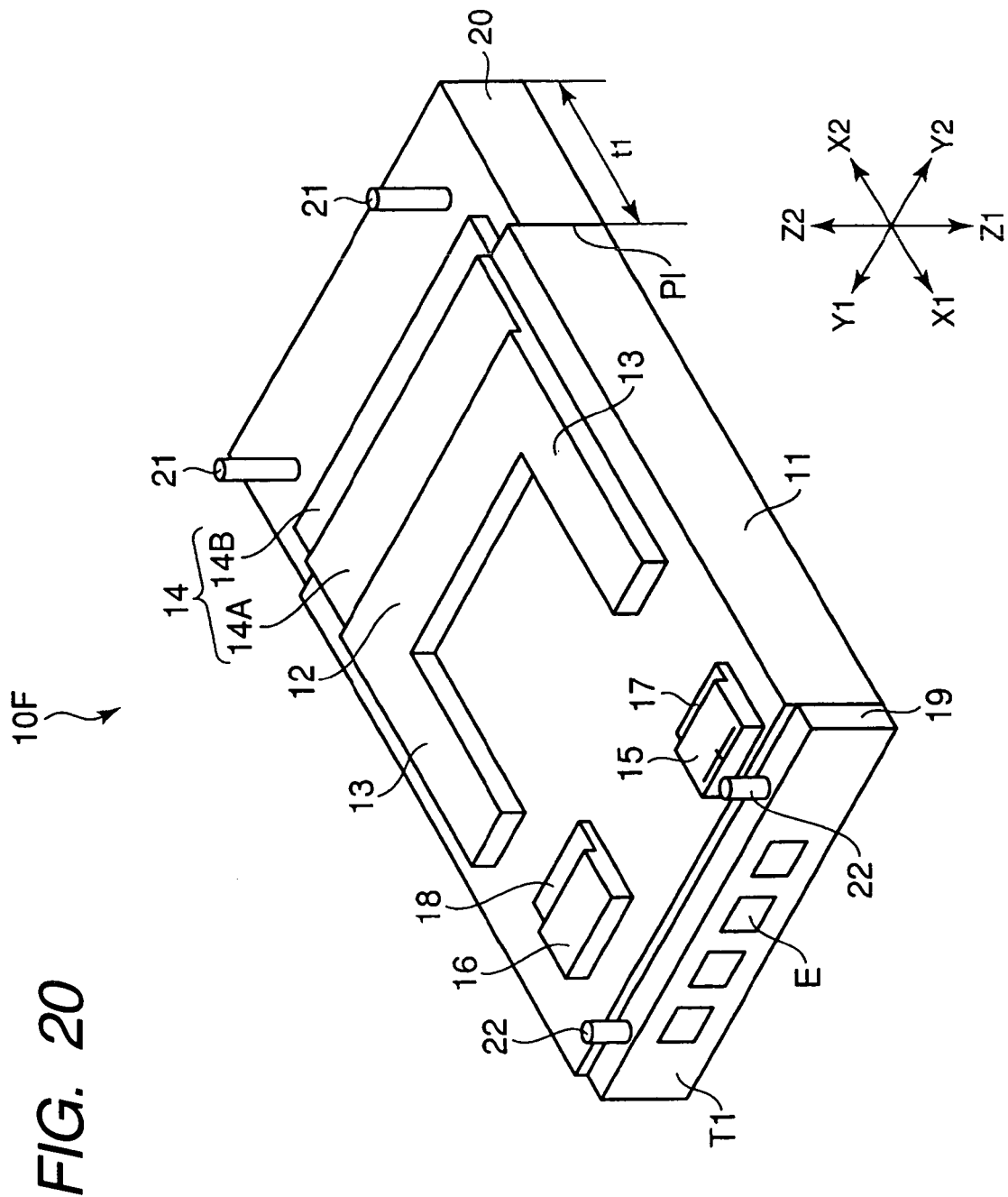
FIG. 20 is a perspective view illustrating a modification of the magnetic head slider according to the second embodiment of the invention formed by the processes of FIGS. 19A to 19C.

FIGS. 19A to 19C are cross-sectional views illustrating another process of manufacturing a magnetic head slider according to a modification of the magnetic head slider according to the second embodiment of the invention. FIG. 20 is a perspective view illustrating a modification of the magnetic head slider according to the second embodiment of the invention formed by the processes of FIGS. 19A to 19C. In FIGS. 19A to 19C, only resists and projecting portions are hatched.

In this method of manufacturing the magnetic head slider, first, by using the process shown in FIG. 12A, a part of the shock absorbing layer 20 is formed as the projecting portion 21, the part of the protective layer 19 is formed as the protruding portion 22, and the shape shown by the solid line of FIG. 19A (excluding the resists) is obtained. Then, by means of the same processes as those shown in FIGS. 14A and 14B, the shape shown in FIG. 19C is obtained.

After the leading-side ABS surface 12 or the like is formed as described above, the slider bar 30 is cut at portions shown by dotted lines of FIG. 8, and the magnetic head slider 10F shown in FIG. 20 is manufactured. In the magnetic head slider 10F formed in this manner, the thickness t1 of the shock absorbing layer 20 is within a range of 20 to 40 μm.

In this method of manufacturing the magnetic head slider, since the projecting portion 21 can be formed by performing only the etching process, it is possible to easily form the projecting portion 21 and the magnetic head slider 10D having the projecting portion 21.

Figure 21:
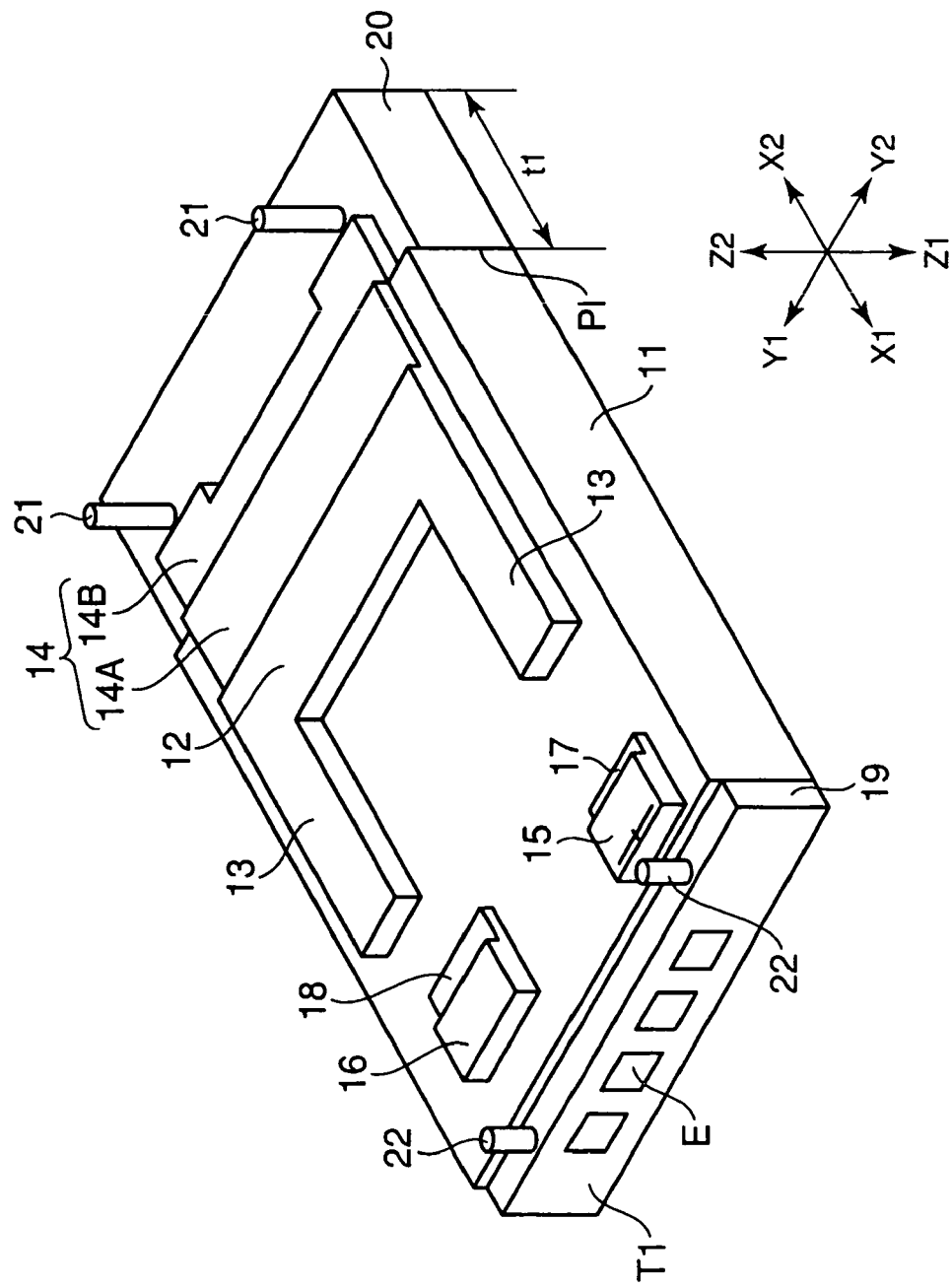
FIG. 21 is a perspective view illustrating a magnetic head slider where a portion of a stepped surface is connected to a bottom portion of a protruding portion.

Further, as described above, even though the projecting portion 21 is integrated with the shock absorbing layer 20 and the protruding portion 22 is integrated with the protective layer 19, by deforming the portions covered with the resists as shown in FIG. 16 and performing the same processes as the cases of FIGS. 17A and 17C, the magnetic head slider 10D2 can be manufactured, as shown in FIG. 21, in which the portion 14B of the step surface 14 is connected to the bottom surface of each of the projecting portions 21 and 21. FIG. 21 is a perspective view illustrating the magnetic head slider 10D2.

In the processes shown in FIGS. 11, 12, 14, 17, and 19, the projecting portion 21 and the protruding portion 22 are provided before the leading-side ABS surface 12 or the like is formed. However, after the leading-side ABS surface 12 or the like is formed, the projecting portion 21 and the protruding portion 22 may be formed.

Figure 22:
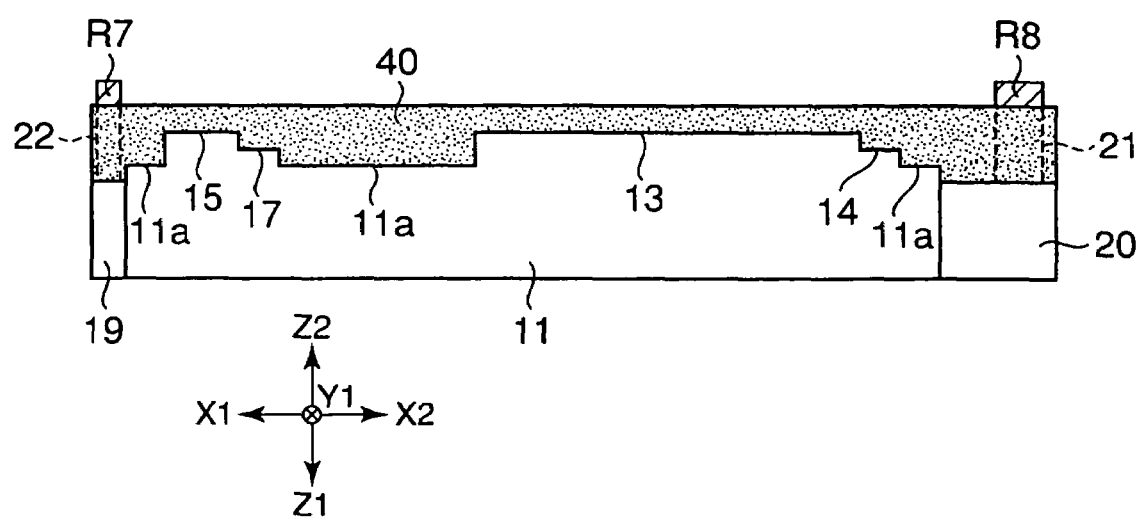
FIG. 22 is a cross-sectional view illustrating another method of manufacturing a magnetic head slider.

FIG. 22 is a cross-sectional view illustrating another method of manufacturing a magnetic head slider. In FIG. 22, only resists and a low hardness layer are hatched.

For example, the leading-side ABS surface 12 or the step surface 14 is formed at the side opposite to the magnetic disk D, and the shape shown by a solid line of FIG. 22 (the shape of the portion which is not hatched and the same shape as FIG. 9C) is obtained. Then, on the entire surface of the leading-side ABS surface 12 or the like, the low hardness layer 40 is provided by using the same process as FIG. 11A. Then, by performing the etching process using the resists R7 and R8, the projecting portion 21 is formed on the surface of the shock absorbing layer 20, and the protruding portion 22 is formed on the surface of the protective layer 19.

In the processes shown in FIGS. 11, 12, 14, 17, 19 and 22, the protruding portion 21, the leading-side ABS surface 12, or the like are formed by using the different processes. However, the protruding portion 21, the leading-side ABS surface 12, or the like may be formed at the same time.

Figure 23A:
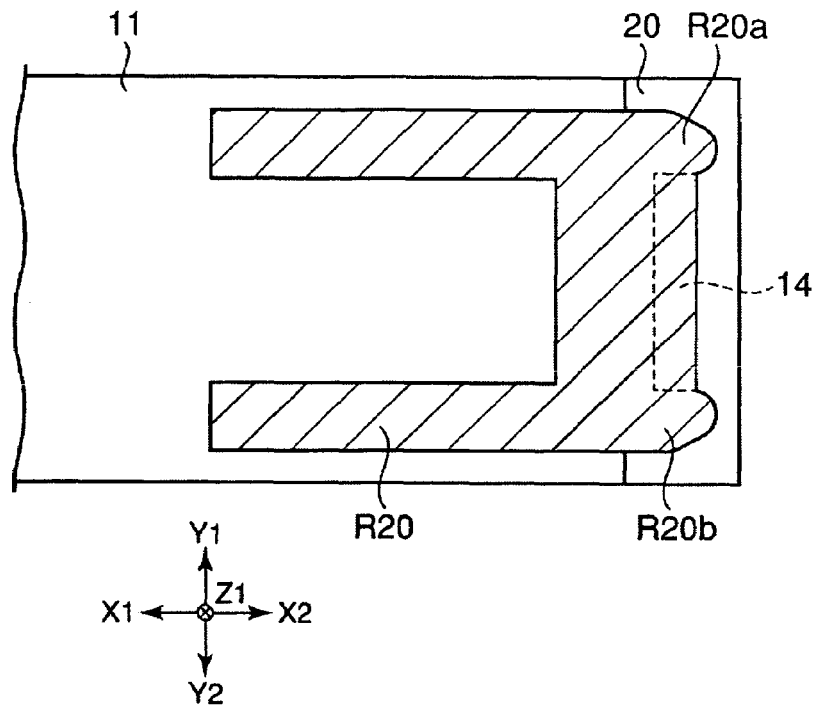
FIG. 23A is a partial plan view illustrating a process of manufacturing the magnetic head slider when a projecting portion, a leading-side ABS surface, or the like are simultaneously formed.
Figure 23B:
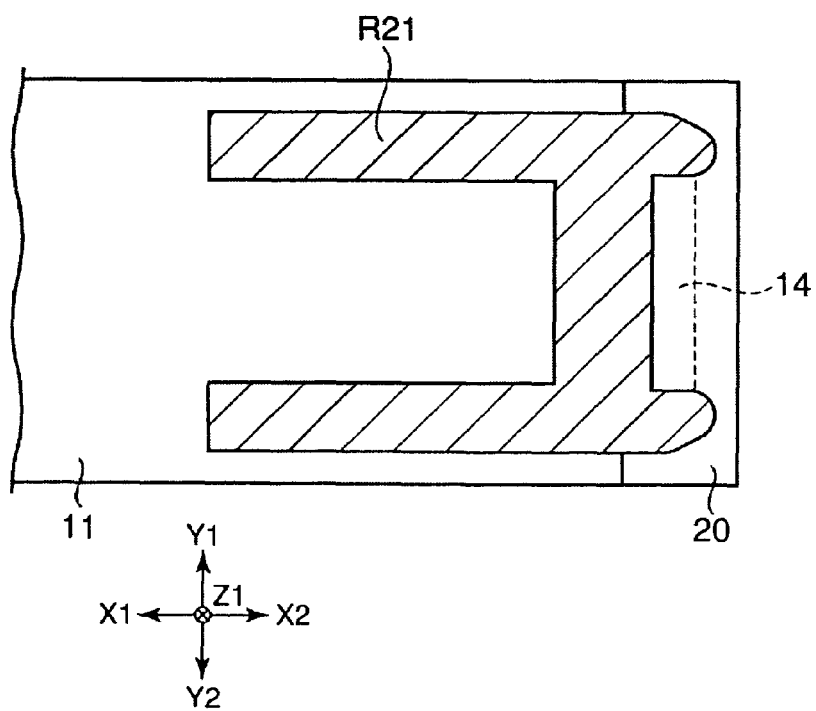
FIG. 23B is a partial plan view illustrating a process of manufacturing the magnetic head slider when a projecting portion, a leading-side ABS surface, or the like are simultaneously formed.
Figure 24:
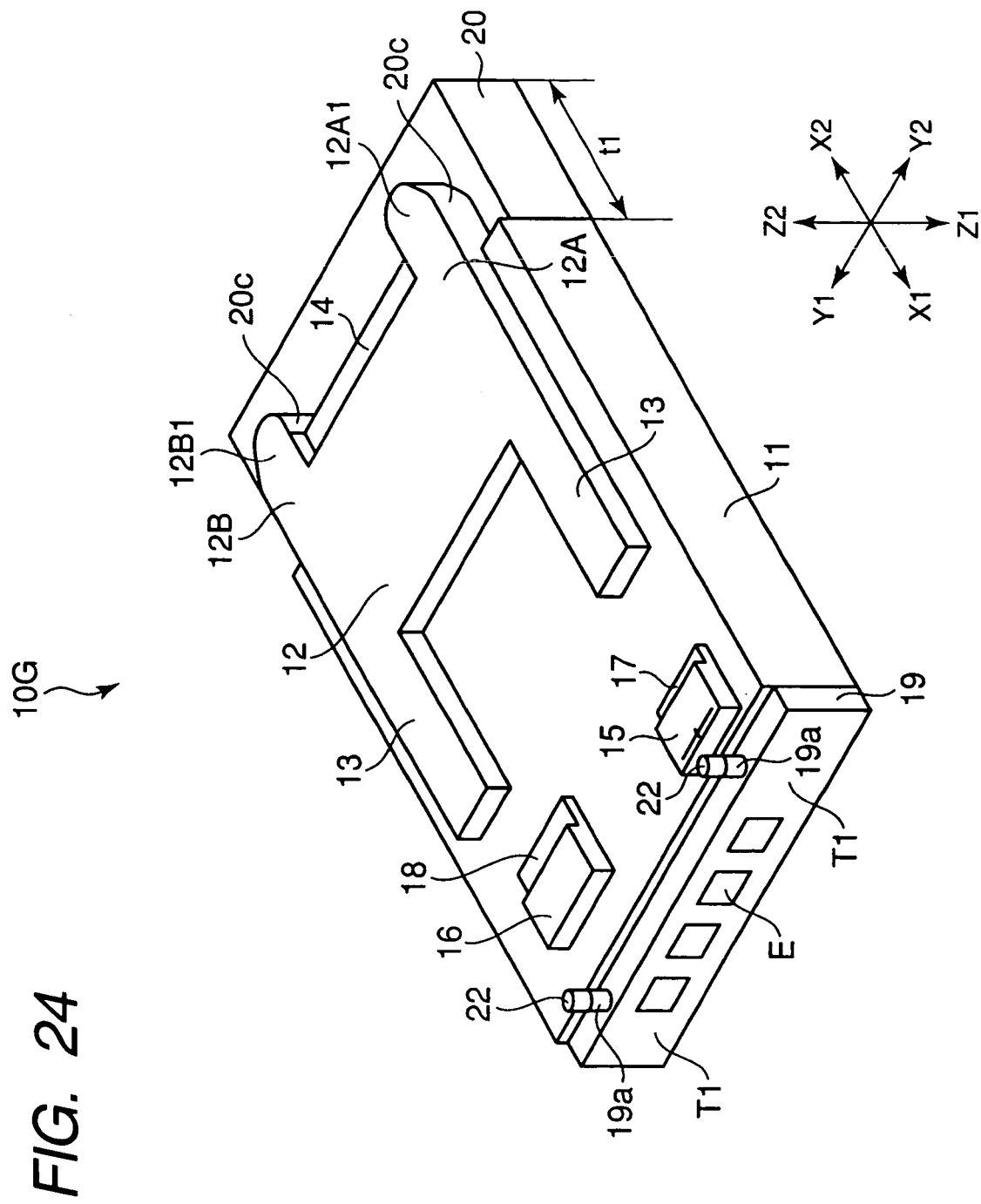
FIG. 24 is a perspective view illustrating the magnetic head slider manufactured by the processes of FIGS. 23A and 23B.

FIGS. 23A and 23B are partial plan views illustrating a process of manufacturing the magnetic head slider when a protruding portion, a leading-side ABS surface, or the like are simultaneously formed, and FIG. 24 is a perspective view illustrating the magnetic head slider manufactured by the processes of FIGS. 23A and 23B.

First, as shown in FIG. 23A, the resist 20, which has the same shape as the resist R110 shown in FIG. 16 and which has the portions R20a and R20b formed at both ends of the resist 20 in a width direction, is covered on the slider substrate, the protective layer 19, and the shock absorbing layer 20. Then, portions of the slider substrate 11, the protective layer 19, and the shock absorbing layer 20, which are not covered with the resist R20, are etched. After the etching process is performed, excluding the portion corresponding to the step surface 14, the resist R21 having the same shape as FIG. 23A is covered on the slider substrate 11, the protective layer 19, and the shock absorbing layer 20. Then, portions of the slider substrate 11, the protective layer 19, and the shock absorbing layer 20, which are not covered with the resist R21, are etched. In addition, the trailing side, which is not shown in FIGS. 23A and 23B, is processed by the same process as FIGS. 14B and 14C, so that the trailing-side ABS surface 15 or the like is formed. In this manner, the magnetic head slider 10G shown in FIG. 24 is manufactured. In the magnetic head slider 10G formed in this manner, the thickness t1 of the shock absorbing layer 20 is within a range of 20 to 40 µm.

In the magnetic head slider 10G, the leading-side ABS surface 12 has the extending portions 12A and 12B which is formed in the width direction of the leading-side ABS surface 12 and extend in an X2 direction in the drawing. The front end portions 12A1 and 12B1 of the extending portions 12A and 12B are respectively integrated with the projecting portions 20c and 20c formed by cutting and erecting the portions of the shock absorbing layer 20 in three different directions. Since the front end portions 12A1 and 12B1 of the extending portions 12A and 12B are respectively integrated with the projecting portions 20c and 20c, each of the projecting portions 20c and 20c can be used as a positive pressure generating surface. That is, if the projecting portions like the projecting portions 20c and 20c are formed in the vicinity of the leading-side end portion L1, a turbulent flow is generated in the inflow air due to the projecting portions. However, since the each of the projecting portions 20c and 20c can be used as the positive pressure generating surface, it is possible to prevent the turbulent flow from being generated in the inflow air.

Further, according to the method of manufacturing the magnetic head slider illustrated in FIGS. 23A and 23B, the projecting portions 20c and 20c are formed at the same time as the leading-side ABS surface 12. For this reason, the projecting portions 20c and 20c, and the magnetic head slider 10E having the projecting portions 20c and 20c can be easily manufactured in a short time.

Further, in the processes shown in FIGS. 11, 12, 14, 17, 19, 22, and 23, the protruding portion 22 is formed on the surface of the protective layer 18, but the protruding portion 22 may be formed in the processes shown in FIGS. 9 and 10.

COMPARATIVE EXAMPLE

Figure 25:
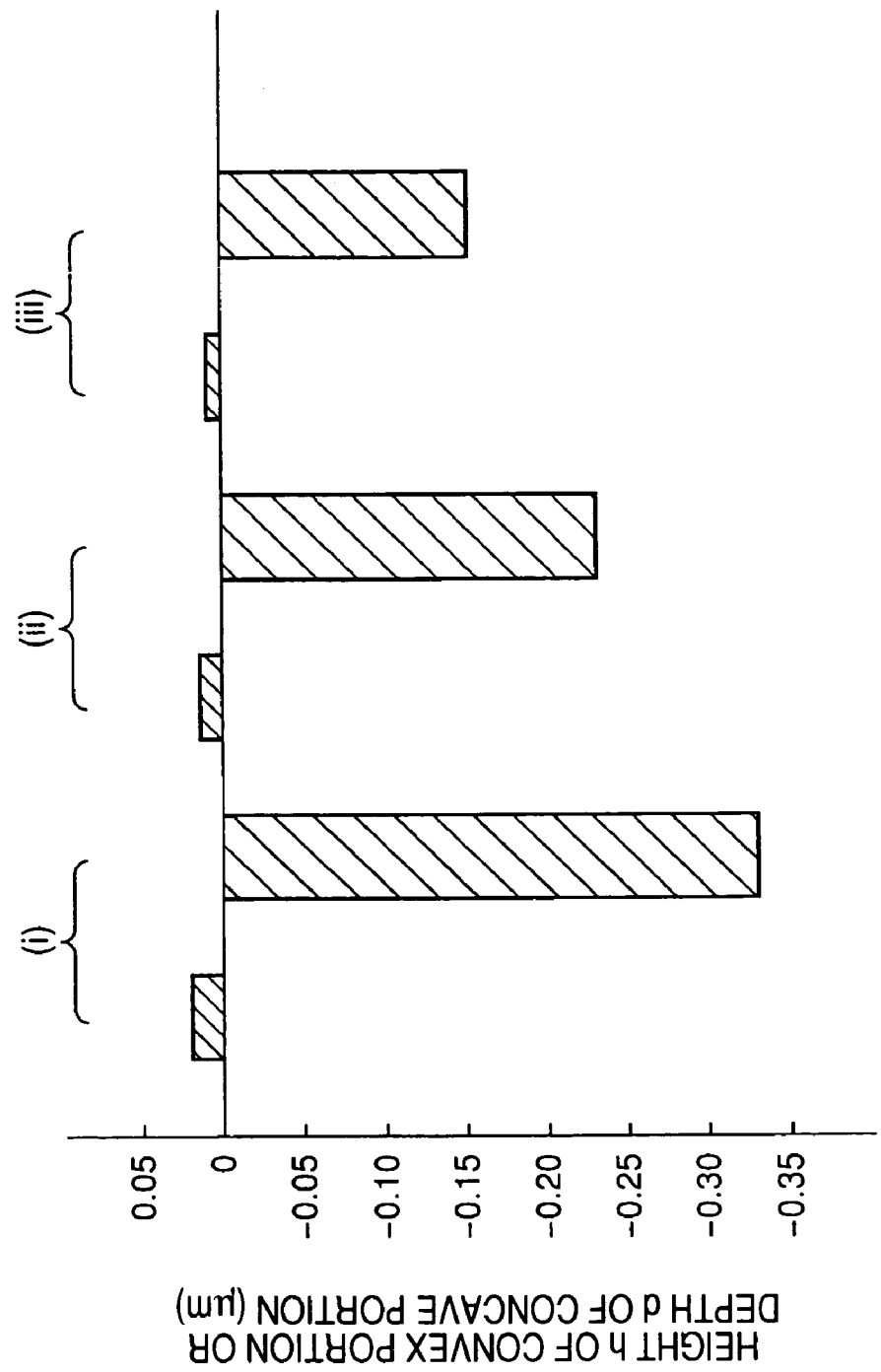
FIG. 25 is a graph illustrating a compared result among magnetic head sliders for a height of a convex portion and a depth of a concave portion generated on a surface of the magnetic disk when the respective magnetic head sliders contact with a surface of the magnetic disk, in (i) the conventional magnetic head slider where a shock absorbing layer is not provided, (ii) the magnetic head slider shown in FIGS. 1 and 4 where the shock absorbing layer is provided, and (iii) the magnetic head slider shown in FIGS. 5 and 6 where the shock absorbing layer is provided and a protruding portion is provided on a surface of the shock absorbing layer.

FIG. 25 is a graph illustrating a compared result among magnetic head sliders for a height h of a convex portion and a depth d of a concave portion generated on a surface of the magnetic disk when the respective magnetic head sliders contact with a surface of the magnetic disk, in (i) a conventional magnetic head slider where a shock absorbing layer is not provided, (ii) the magnetic head slider shown in FIGS. 1 and 4 where the shock absorbing layer is provided, and (iii) the magnetic head slider shown in FIGS. 5 and 6 where the shock absorbing layer is provided and a protruding portion is provided on a surface of the shock absorbing layer. The height h of the convex portion is represented as a positive value, and the depth d of the concave portion is represented as a negative value. In addition, the experiment is repeated many times. Each of the values shown in FIG. 25 is an average value of values obtained by repeatedly performing the experiment many times.

Referring to FIG. 25, as for the height h of the convex portion, in (i) the conventional magnetic head slider where a shock absorbing layer is not provided, the height h of the convex portion is 0.0232 µm; in (ii) the magnetic head slider shown in FIGS. 1 and 4 where the shock absorbing layer is provided, the height h of the convex portion is 0.015 µm; and in (iii) the magnetic head slider shown in FIGS. 5 and 6 where the shock absorbing layer is provided and a projecting portion is provided on a surface of the shock absorbing layer, the height h of the convex portion is 0.011 µm. Further, as for the depth d of concave portion, in (i) the conventional magnetic head slider where a shock absorbing layer is not provided, the depth d of the concave portion is −0.3321 µm; in (ii) the magnetic head slider shown in FIGS. 1 and 4 where the shock absorbing layer is provided, the depth d of the concave portion is −0.23 µm; and in (iii) the magnetic head slider shown in FIGS. 5 and 6 where the shock absorbing layer is provided and a protruding portion is provided on a surface of the shock absorbing layer, the depth d of the concave portion is −0.157 µm. That is, an absolute value of the height h of the convex portion and an absolute value of the depth d of the concave portion are smaller in the case (ii) than in the case (i) and are smaller in the case (iii) than in the case (ii). Therefore, in the cases (that is, the cases (ii) and (iii), in which the shock absorbing layer is provided, rather than the case in which the conventional shock absorbing layer is not provided (the case (i)), it can be apprehended that it is possible to further prevent the magnetic disk D from being damaged. In addition, in the case (that is, the case (iii)), in which the shock absorbing layer is provided and the projecting portion is formed on the surface of the shock absorbing layer, rather than the case in which only the shock absorbing layer is provided (the case (ii)), it can be apprehended that it is possible to further prevent the magnetic disk D from being damaged.

Figure 26:
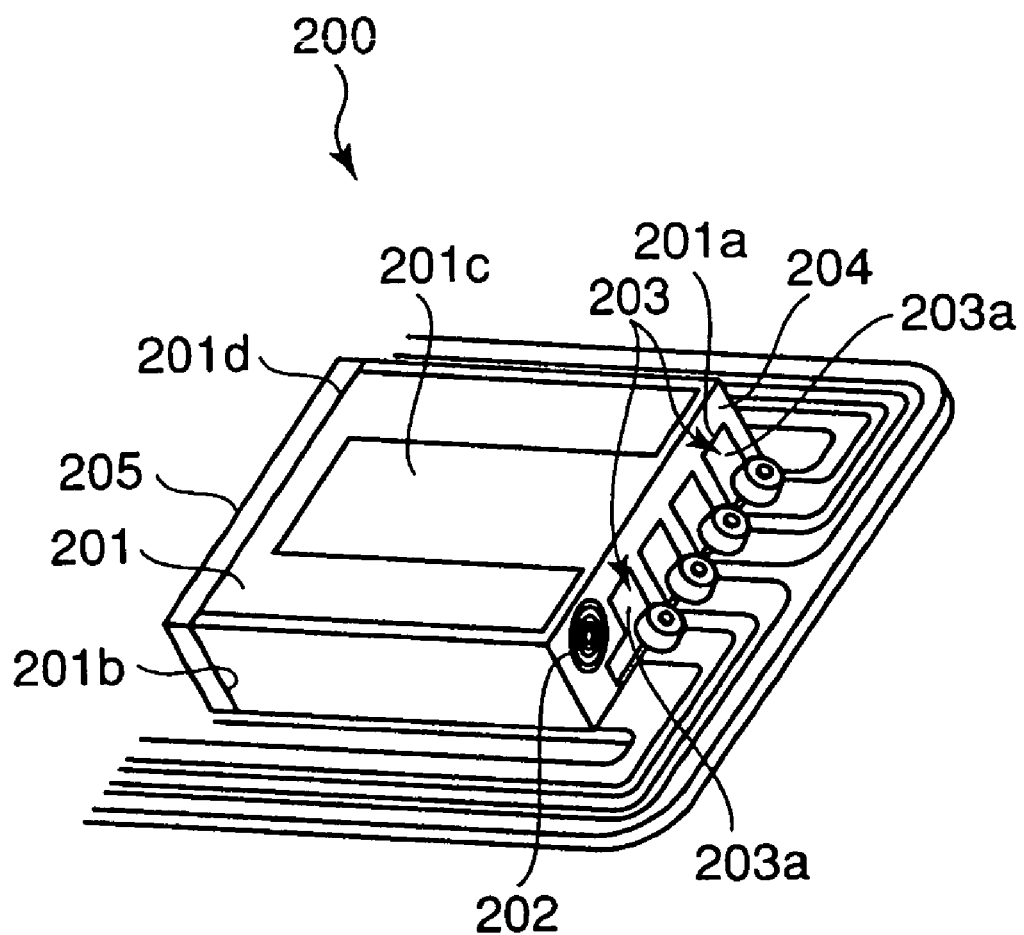
FIG. 26 is an enlarged perspective view illustrating a main portion of a conventional magnetic head.
Figure 26:
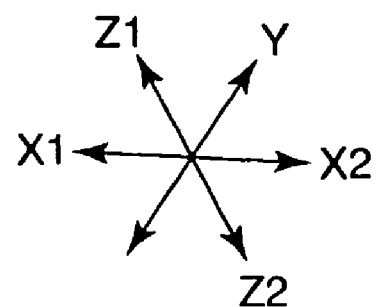

Further, as in the conventional magnetic head slider shown in FIG. 26, if the thickness of the insulating film 205 provided at the leading-side of the slider substrate is set to 1 µm, the height h of the convex portion and the depth d of the concave portion were the same as those in (i) the conventional magnetic head slider where the shock absorbing layer is not provided. That is, if the thickness of the other portion is set to 1 µm in the same manner as the insulating film 205, it could be apprehended that it is not possible to prevent the magnetic disk D from being damaged. Therefore, as in the embodiments of the invention, the thickness of the shock absorbing layer 20 is set within a range of 20 to 40 µm, so that it is possible to prevent the magnetic disk D from being damaged.

The invention claimed is:

1. A magnetic head slider comprising:
a slider substrate that has a recording medium facing surface on which an ABS surface protruding toward a recording medium is provided; and
at least one of recording or reproducing magnetic elements that are provided at a trailing side of the slider substrate,
wherein, a shock absorbing layer that has a hardness lower than a hardness of the slider substrate is provided at a leading side of the slider substrate opposite to the trailing side with a thickness of 20 to 40 µm;
wherein a circumference of the ABS surface is cut so as to form step surfaces located closer to a supporting surface side of the magnetic head slider than the ABS surface; and
wherein at least one of leading-side peripheral portion of the ABS surface or the step surface is located closer to the shock absorbing layer side than a bonding surface between the slider substrate and the shock absorbing layer.

2. The magnetic head slider according to claim 1, wherein the shock absorbing layer comprises at least one of $Al_2O_3$ or $SiO_2$.

3. A magnetic head slider comprising:
a slider substrate that has a recording medium facing surface on which an ABS surface protruding toward a recording medium is provided; and
at least one of recording or reproducing magnetic elements that are provided at a trailing side of the slider substrate,
wherein a shock absorbing layer that has a hardness lower than a hardness of the slider substrate is provided at a leading side of the slider substrate opposite to the trailing side;
wherein a circumference of the ABS surface is cut so as to form step surfaces located closer to a supporting surface side of the magnetic head slider than the ABS surface; and
wherein at least one of leading-side peripheral portion of the ABS surface or the step surface is located closer to the shock absorbing layer side than a bonding surface between the slider substrate and the shock absorbing layer; and
projecting portions protruding toward the recording medium are provided on a surface of the shock absorbing layer.

4. The magnetic head slider according to claim 3, wherein the shock absorbing layer comprises at least one of $Al_2O_3$ or $SiO_2$.

5. The magnetic head slider according to claim 3, wherein each of the projecting portions is formed of a material that has a hardness lower than the hardness of the slider substrate.

6. The magnetic head slider according to claim 5, wherein each of the projecting portions comprises at least one of $Al_2O_3$ or $SiO_2$.

7. The magnetic head slider according to claim 3, wherein the shock absorbing layer and the projecting portions are formed of the same material.

8. The magnetic head slider according to claim 3, wherein the projecting portions and the shock absorbing layer are separate.

9. The magnetic head slider according to claim 3, wherein the projecting portions and the shock absorbing layer are integrally formed.

10. The magnetic head slider according to claim 3, wherein each of the projecting portions protrudes toward the recording medium rather than a leading-side end portion of the slider substrate.

11. The magnetic head slider according to claim 1, wherein protruding portions protruding toward the recording medium are provided on a surface of a protective layer of each of the magnetic elements that are provided at the trailing side of the slider substrate.

12. A method of manufacturing a magnetic head slider, the method comprising steps of;
(a) forming, at least one of recording or reproducing magnetic elements on a slider substrate, and forming a shock absorbing layer having a hardness lower than a hardness of the slider substrate with a thickness of 20 to 40 µm on a leading-side end face of the slider substrate opposite to a trailing-side end face in which the magnetic elements are formed;
(b) covering a recording medium-side ABS surface of the slider substrate with a mask layer, the shock absorbing layer being provided at the slider substrate; and
(c) forming an ABS surface by cutting a recording medium-side region of the slider substrate which is not covered with the mask layer;
wherein, in the step (b), a leading-side peripheral portion of the mask layer is located closer to the shock absorbing layer side than a bonding surface between the slider substrate and the shock absorbing layer.

13. The method of manufacturing a magnetic head slider according to claim 12, further comprising of forming a step surface by cutting a circumference of the ABS surface after the step (c).

14. The method of manufacturing a magnetic head slider according to claim 12,
wherein, in the step (a), the shock absorbing layer comprises at leas one of $Al_2O_3$ or $SiO_2$.

15. The method of manufacturing a magnetic head slider according to claim 12,
wherein a protective layer for covering each of the magnetic elements is provided at a trailing side of the slider substrate, and protruding portions protruding toward the recording medium are formed on a surface of the protective layer.

16. A method of manufacturing a magnetic head slider, the method comprising steps of;
(d) at least one of forming recording or reproducing magnetic elements on a slider substrate, and forming a shock absorbing layer having a hardness lower than a hardness of the slider substrate on a leading-side end face of the slider substrate opposite to a trailing-side end face in which the magnetic elements are formed;
(e) forming projecting portions protruding toward a recording medium on a recording medium facing surface of the shock absorbing layer;
(f) covering a recording medium-side ABS surface of the slider substrate with a mask layer, the shock absorbing layer being provided at the slider substrate; and
(g) forming an ABS surface by cutting a recording medium-side region of the slider substrate which is not covered with the mask layer; and
wherein, in the step (f), a leading-side peripheral portion of the mask layer is located closer to the shock absorbing layer side than a bonding surface between the slider substrate and the shock absorbing layer.

17. The method of manufacturing a magnetic head slider according to claim 16,
  wherein, in the step (e), each of the projecting portions is formed of material that has a hardness lower than the hardness of the slider substrate.

18. The method of manufacturing a magnetic head slider according to claim 17,
  wherein, in the step (e), each of the projecting portions comprises at least one of $Al_2O_3$ or $SiO_2$.

19. The method of manufacturing a magnetic head slider according to claim 16,
  wherein, in the step (e), the shock absorbing layer and the projecting portions are formed of the same material.

20. The method of manufacturing a magnetic head slider according to claim 16,
  wherein, in the step (e), the projecting portions and the shock absorbing layer are separate.

21. The method of manufacturing a magnetic head slider according to claim 16,
  wherein, in the step (e), the projecting portions and the shock absorbing layer are integrally formed.

22. The method of manufacturing a magnetic head slider according to claim 16,
  wherein, each of the projecting portions is formed at the same time when forming the ABS surface.

23. The method of manufacturing a magnetic head slider according to claim 16,
  wherein each of the projecting portions protrudes toward the recording medium rather than a position of leading-side end portion of the slider substrate.

24. The method of manufacturing a magnetic head slider according to claim 16, further comprising a step of forming a step surface by cutting a circumference of the ABS surface after the step (g).

25. The method of manufacturing a magnetic head slider according to claim 16,
  wherein, in the step (d), the shock absorbing layer comprises at least one of $Al_2O_3$ or $SiO_2$.

* * * * *